US 6,636,942 B2

(12) United States Patent
Greco

(10) Patent No.: US 6,636,942 B2
(45) Date of Patent: Oct. 21, 2003

(54) STORAGE STRUCTURE FOR STORING FORMATTED DATA ON A RANDOM ACCESS MEDIUM

(75) Inventor: Paul Merrill Greco, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 160 days.

(21) Appl. No.: 09/970,881

(22) Filed: Oct. 5, 2001

(65) Prior Publication Data
US 2003/0070056 A1 Apr. 10, 2003

(51) Int. Cl.[7] .............................................. G06F 13/10
(52) U.S. Cl. ....................................................... 711/112
(58) Field of Search .............................. 711/4, 111, 112

(56) References Cited

U.S. PATENT DOCUMENTS

| | | | |
|---|---|---|---|
| 4,145,745 A | 3/1979 | De Bijl et al. ............... 364/200 |
| 4,467,421 A | 8/1984 | White ........................ 364/200 |
| 4,511,963 A | 4/1985 | Kantner ...................... 364/200 |
| 4,775,969 A | 10/1988 | Osterlund ................... 369/53 |
| 4,947,367 A | 8/1990 | Chang et al. ............... 364/900 |
| 5,210,660 A | 5/1993 | Hetzler ........................ 360/51 |
| 5,297,124 A | 3/1994 | Plotkin et al. ............... 369/32 |
| 5,301,304 A | 4/1994 | Menon ........................ 395/500 |
| 5,454,098 A | 9/1995 | Pisello et al. ............... 395/500 |
| 5,455,926 A | 10/1995 | Keele et al. ................. 395/404 |
| 5,581,743 A | 12/1996 | Burton et al. ............... 395/500 |
| 5,642,497 A | 6/1997 | Crary et al. ................. 395/500 |
| 5,724,541 A | 3/1998 | Tsukamoto et al. ......... 395/438 |
| 5,758,360 A | 5/1998 | Zbikowski et al. ......... 707/205 |
| 6,070,224 A | 5/2000 | LeCrone et al. ............ 711/112 |
| 6,128,698 A | 10/2000 | Georgis ....................... 711/111 |
| 6,490,648 B1 * | 12/2002 | Kaneda et al. ................. 711/4 |
| 6,496,901 B1 * | 12/2002 | De Martine et al. ........ 711/113 |

FOREIGN PATENT DOCUMENTS

JP 7319629 12/1995 ............. G06F/3/06

* cited by examiner

Primary Examiner—Kevin L. Ellis
(74) Attorney, Agent, or Firm—John H. Holcombe

(57) ABSTRACT

Structures are provided for mapping data of any of various formats, and for storing data of a linear sequential format, on a random access medium, e.g., having equal sized, sequentially numbered logical sectors. A third level construct comprises regions for data, identifies the region in terms specific to the format and to the sectors. A second level construct comprises a global device block map having an element for each region, identifying the format and bounds of the region in terms of the sectors and specific format, and associates related regions into partitions. A first level construct comprises a format identifier having a pointer indicating location and size of the second level construct in terms of the sectors. For data of variable length sequential device blocks, each device block has a header with multiple backwards references to close and distant previous device blocks.

57 Claims, 14 Drawing Sheets

STORAGE STRUCTURE FOR STORING FORMATTED DATA ON A RANDOM ACCESS MEDIUM

FIELD OF THE INVENTION

This invention relates to the storage of formatted data on a random access medium, and, more particularly, to the storage of data which may comprise any of multiple data storage formats, and to the storage of data which may comprise sequentially formatted data, such as that of magnetic tape, on a random access medium.

BACKGROUND OF THE INVENTION

The typical primary data storage for a computer system comprises a random access magnetic disk drive with non-removable disks, and the typical backup data storage comprises a tape drive, an optical drive, or a tape or optical library, all employing removable data storage media, such as tape cartridges or optical disk cartridges. The random access of the magnetic disk drive provides quick access to data, and removable data storage media provides low cost, high reliability storage, and archivability for the data. Optical disk cartridges, once the cartridge is accessed, may provide a level of random access, albeit much slower than the high speed random access of a magnetic disk drive. Magnetic tape cartridges store data in a linear sequential format and access data by unwinding the tape from one reel and winding it onto another reel. Thus, the tape is moving linearly while the host is searching for data, and, once the beginning of a file is found, the remainder of the file is located in sequence from the beginning of the file. Additionally, tape drives may operate forwards and backwards and the host may initially find a file at the rear, and the remainder of the file is located in sequence from the rear. Extensions to a file may be located elsewhere on a tape and have to be accessed separately by the host. The records making up the file may be of variable length, but, so long as the tape must be moved linearly, the search for a specific record in the file may be conducted by reading the header of each record in the file as it is passed during the search, until the desired record is found. As an example, the IBM 3590 tape drives employ device blocks of one or more records, and each has a header identifying the device block, and may have a pointer to the next adjacent device block. The device blocks of the tape are arranged in a hard linear sequential format without employing pointers in the headers. The host manages the data, and conducts any searching and the read and write operations.

In many situations, it would be advantageous to provide the random access speed of a magnetic disk drive to information stored on magnetic tape or on optical disk. This was recognized, e.g., in U.S. Pat. No. 5,724,541, which provides subsequent random access to data initially stored in a sequential access storage medium, by copying data from the sequential access storage medium to a random access storage medium as corresponding blocks of data. Such an arrangement is essentially duplicative and has difficulties in that the established formats for the two types of data storage are very different.

U.S. Pat. No. 5,454,098 and U.S. Pat. No. 5,297,124 recognize that the formats are different. The '098 patent describes the emulation of a sequential data storage device, e.g., a magnetic tape "streamer", on a random access device by transforming sequential access commands into random access commands to read or write a set of blocks in sequence. The patent emulates tape to "access data on a random access storage device with tape based management software". The '124 patent describes a tape emulation system for a disk drive with a conversion mapping directory located on the outermost sectors of the disk. The patent emulates tape to instead use a disk drive while avoiding "hardware modifications" to a computer system previously having only a tape drive.

In the case of an optical disk, U.S. Pat. No. 4,775,969 describes an optical disk storage format for emulating a tape drive, having a high level directory providing a list of addresses for a plurality of embedded directories which are in close proximity to variable length records. The emulation of a tape drive is to replace a magnetic tape drive with an optical disk drive in a "'plug-compatible' manner".

Thus, in each instance, random access to the linearly sequential data is not a prime consideration, and is not optimized.

Further, data which is to be employed as backup or is archived must have full integrity, as must the capability to access that data, since the data is not likely to be maintained in duplicate media. U.S. Pat. No. 6,128,698 relates to use of a disk drive with a removable disk for storing archival tape-based data and recognizes the need for integrity of the data. The patent describes a tape drive emulator for the drive with the removable disk, employing a buffer for recording compressed data in plural disk drive sectors in sequence with sufficient ECC bytes to recover a complete sector. However, access to the data is assumed to be without failure. It is possible, for example, that a power off situation interrupts a write such that a header or table is damaged or not written, while the data is saved by the host operating system.

Copending, co-assigned U.S. patent application Ser. No. 09/842,030, filed Apr. 26, 2001, describes, inter alia, alternative devices, such as a magnetic disk drive, mounted in portable cartridges which are similar to removable media (tape) cartridges, and a transfer station for providing data transfer with respect to the cartridges. The cartridges may be used in automated data storage libraries, stored in similar, or the same, storage shelves as the removable tape cartridges, and fetched by the library and inserted in the transfer station. An example of an automated data storage library comprises the IBM 3590 tape library. It would be advantageous to write and read the data of the random access medium, such as a disk drive, in the same manner as the data of the removable tape cartridges, and to access the data in an efficient random access manner. Additionally, it would be advantageous to provide a means for assuring access to data on a random access medium despite loss or failure of one or more mapping indexes. Further, it would be advantageous to store and allow access to data of multiple data storage formats on a random access medium. Still further, it would be advantageous to allow the writing and reading of data on a random access medium in a context other than that of the random access medium.

SUMMARY OF THE INVENTION

An object of the present invention is to provide mapping for multiple data storage formats on a random access medium.

A further object of the present invention is to provide mapping for a data storage format in a context dissimilar to that of the underlying random access medium, so that the data may be written and read in that context using normal commands.

Another object of the present invention is to provide direct high performance access to sequentially formatted data, such as in a tape format or an optical format, stored on a random access medium.

Still another object of the present invention is to provide error recovery information for restoring access to data storable in any of multiple formats.

Disclosed are methods, data storage file systems, and random access media, which may be removable, for providing a mapping structure for storing data of any of various formats on a random access medium, and for providing a structure for storing data of a linear sequential format on a random access medium.

In one embodiment, the medium, such as a magnetic disk drive, has a plurality of equal sized logical sectors as a smallest single writeable/readable unit, and the logical sectors are sequentially numbered.

A third level construct is recorded comprising at least one region for writing and reading data in one of the various formats, each region having an identification of the region in terms of specific format of the data. A second level construct is recorded comprising a global device block map having at least one global device block element for each region. Each global device block element identifies bounds of the data recorded in the region in terms of the sequentially numbered logical sectors. A first level construct is recorded comprising at least one format identifier having a pointer indicating the location and size of the second level construct in terms of the sequentially numbered logical sectors. Thus, random access is conducted efficiently to the defined regions, while the format of the data may be employed to write and read the data, without requiring extensive conversion, and the host system may employ commands normal to the expected format of the data. Further, the multiple levels provide alternate paths to the access information so that any damaged or non-written tables or headers may be repaired or recovered.

In another embodiment directed specifically to data in the linear sequential format, a construct is recorded comprising at least one region for writing and reading data in the linear sequential format. The data of the linear sequential format is organized in a stream of sequential device blocks of variable lengths for writing and reading. The region construct provides a pointer to each device block in the stream. Additionally, each device block has a device block header with a plurality of backwards references, each referencing a separate previous device block in the stream, one of the references to an immediately adjacent previous device block, at least one of the references to a closely adjacent previous device block, and at least one of the references to a distant previous device block. Both the region and device block pointers are in terms of device block sequence numbers, and in terms of the sequentially numbered logical sectors. Thus, direct random access may be made to the area of a desired device block, despite the variable lengths of the device blocks, thereby minimizing the number of operations.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
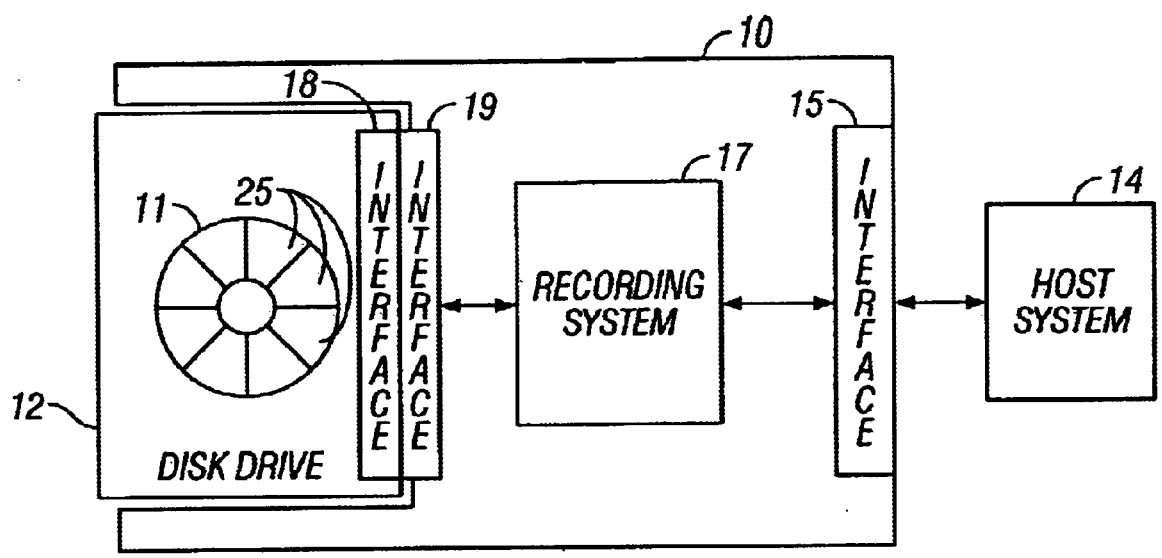
FIG. 1 is a block diagram of a data storage file system coupled to a random access medium, the data storage file system coupled to a host system.

Referring to FIG. 1, a data storage file system 10 is illustrated as coupled to a random access data storage medium 11, such as a magnetic disk of a magnetic disk drive 12. The data storage file system 10 is also coupled to a host system 14, which may comprise a computer, a processor network, an automated data storage library, etc., by means of an interface 15. The data storage file system 10 comprises, inter alia, a data storage recording system 17 coupleable to the random access medium for writing and reading information on the random access medium. As an example, the recording system 17 is coupled to an interface 18 of the disk drive 12 by means of an interface 19.

Figure 2:
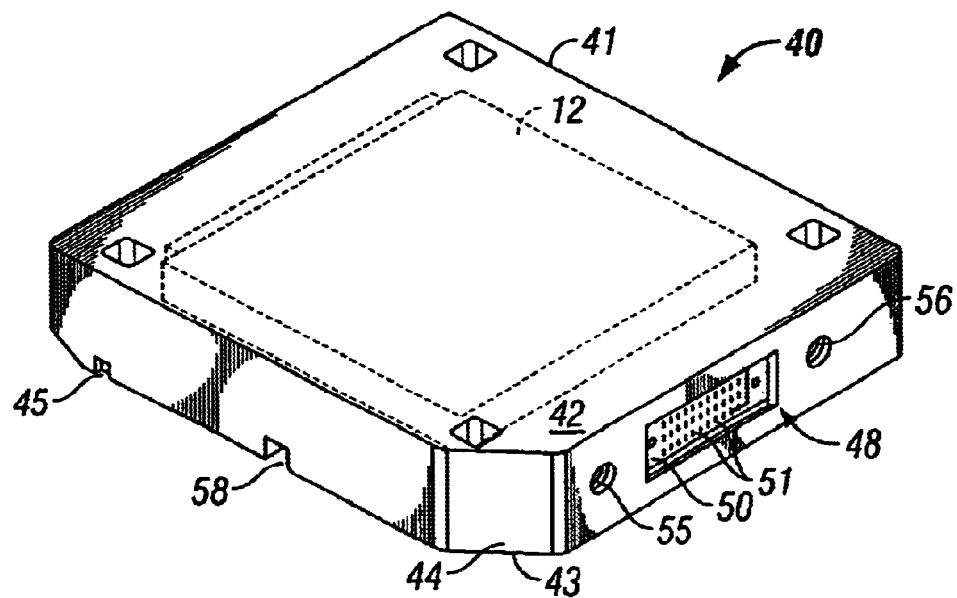
FIG. 2 is a diagrammatic representation of a removable random access data storage drive with a random access medium of FIG. 1.

Referring additionally to FIG. 2, an example of a magnetic disk drive 12 is illustrated, which is contained in a portable data storage cartridge 40. Embodiments of a portable data storage cartridge are described in the copending U.S. patent application Ser. No. 09/842,030, and, in one embodiment contains an encased, self-contained and operational, magnetic data storage drive, such as disk drive 12. The exemplary portable data storage cartridge 40 may be employed in an automated data storage library and is therefore provided having a cartridge shell 41 comprising a substantially identical exterior dimensional form factor as a tape cartridge. An example of an encased, self-contained, magnetic data storage drive of the desired form factor to fit within the cartridge shell 41 comprises the IBM Travelstar 2.5 inch series of magnetic data storage drives.

In the example of FIG. 2, the data storage cartridge comprises a blocking portion 42 to differentiate identification of the data storage cartridge 40 from a tape cartridge. Alternatively, or additionally, a blocking portion 43 may be located on the opposite side of the data storage cartridge 40, or a blocking portion 44 is located at a side of the cartridge.

A notch 45, similar to the notch 35 of tape cartridge 10 of FIG. 1, is provided to interlock with a holder in a storage shelf of an automated data storage library.

An external data transfer interface electrical connector 48 is provided, incorporating a substrate 50, having electrical contacts 51 on a facing surface of the substrate. The electrical contacts 51 are coupled to the data handling agent, and are arranged to match electrical contacts of a transfer station, when in a face-to-face relationship.

Alignment, or registration, holes 55 and 56 are provided and mate with corresponding alignment pins of the transfer station to laterally align and register the data transfer interface of the portable cartridge 40 with a data transfer interface of the transfer station.

The external data transfer interface electrical connector 48 thus comprises a portion of the interface 18 of FIG. 1.

Figure 3:
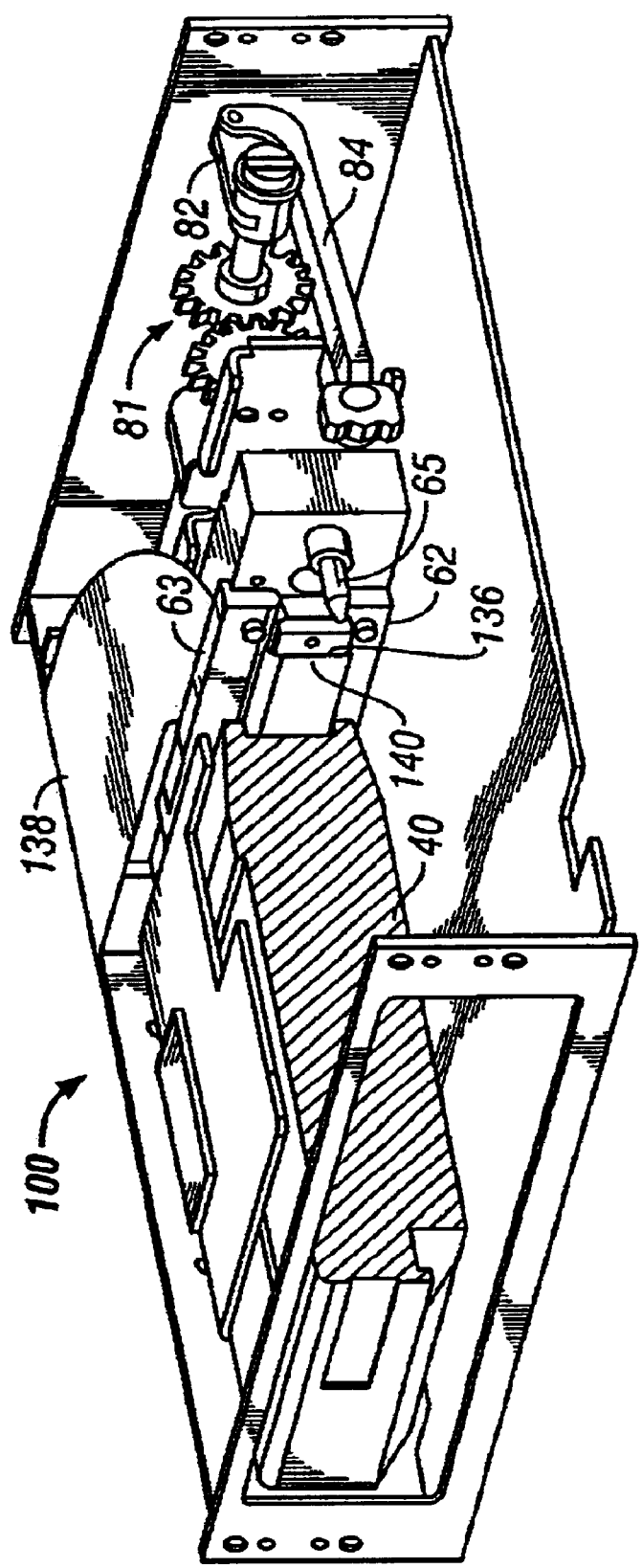
FIG. 3 is an isometric view of a transfer station of the data storage file system of FIG. 1 for providing data transfer with respect to the removable random access data storage drive of FIG. 2.

Additionally referencing FIG. 3, the data storage file system 10 may comprise a loader 100 for loading the portable data storage cartridge 40. An example of a loader is also described in the copending U.S. patent application Ser. No. 09/842,030, and comprises a flex cable 138 having electrical contacts on a facing surface 140 of a termination 136. Clamps 62 and 63 are bolted into place to hold the flex cable 138 in place. The transfer station 100 additionally comprises alignment pins 65 for mating with respective registration holes 55 and 56 of the portable data storage cartridge 40 of FIG. 2 to register the external data transfer interface electrical connector 48 with the matching circuitized flexible substrate 136.

The loader of the transfer station 100 loads the portable data storage cartridge, exerting a force normal to the facing surface 140 of the flex cable 138. FIG. 3 illustrates a cartridge that has been loaded. Much of the mechanism of the copending U.S. patent application Ser. No. 09/842,030 is not shown herein. A motor operates through a gear train 81 to rotate a bell crank 82 away from the front, and toward the rear, of the transfer station 100. Bell crank 82 thus pulls beam 84 toward the rear of the transfer station, which pulls a receiver and therefore the portable cartridge 40, towards the rear of the transfer station, such that the alignment pins 65 engage corresponding holes 55 and 56 of the cartridge to laterally align the portable cartridge substrate and the matching circuitized flexible substrate 136, registering the cartridge substrate electrical contacts 51 in face-to-face relation with the electrical contacts on the facing surface 140. The loader exerts a normal force on the portable cartridge and cause the portable cartridge substrate 50 to create non-wiping contact between the electrical contacts 51 of the portable cartridge substrate 50 and the electrical contacts of the matching circuitized flexible substrate 136, thereby forming a releasable, repeatable electrical connection therebetween.

Thus, the random access data storage device 12 is coupled to the data storage file system 10 of FIG. 1.

Figure 4:
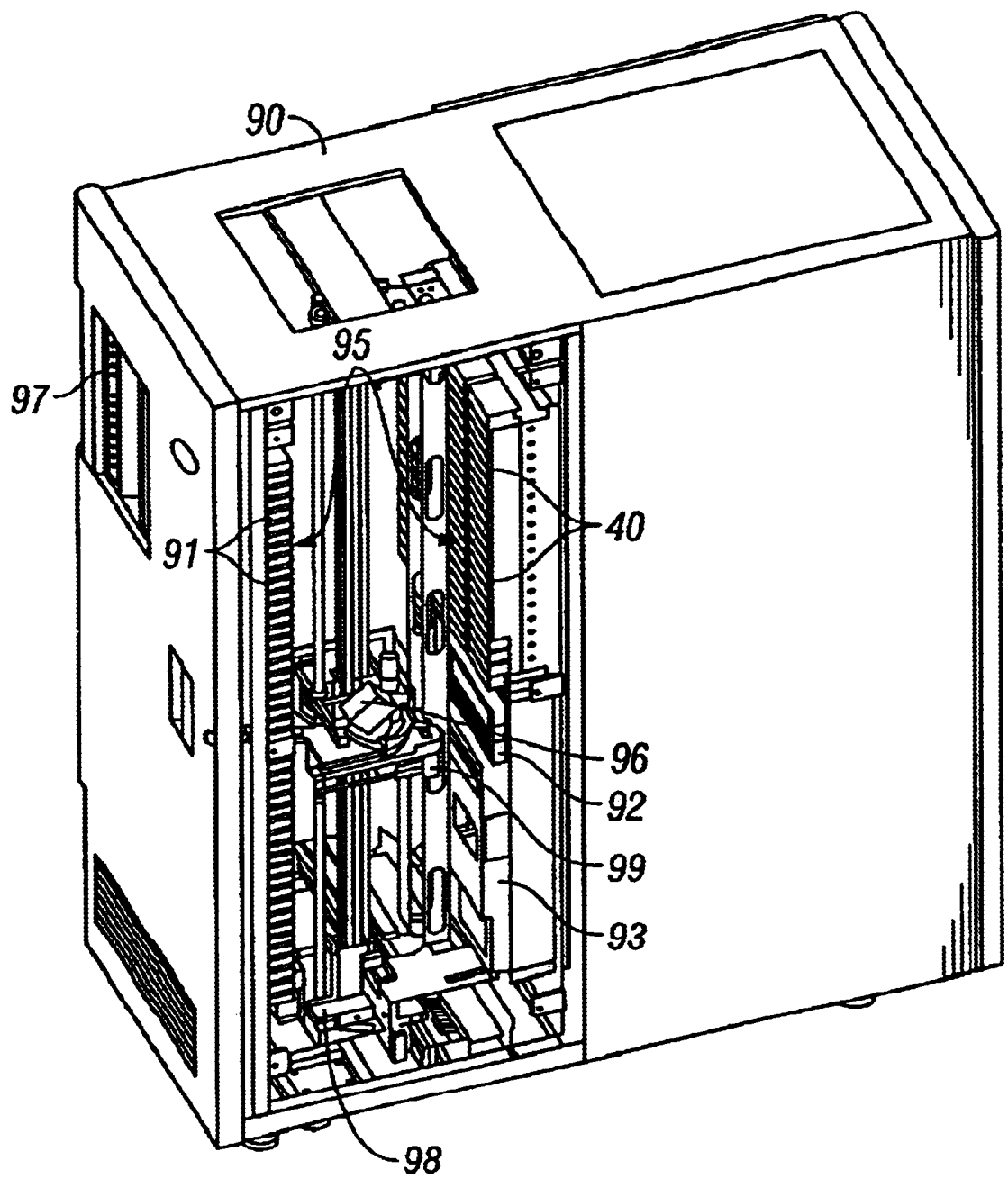
FIG. 4 is an isometric view of an automated data storage library having the data storage file system of FIG. 1 and for storing, transporting, and providing data transfer with respect to the removable random access data storage drive of FIG. 2.

A backup data storage comprises a tape drive, an optical drive, or a tape or optical library, all employing removable data storage media, such as tape cartridges or optical disk cartridges. FIG. 4 illustrates an automated data storage library 90 for storing, transporting, and providing data transfer with respect to tape cartridges 91 and portable data storage cartridges 40 of FIG. 2. An example of an automated data storage library comprises the IBM 3590 library. The library 90 comprises at least one, and preferably a plurality of, data storage drives 92 for reading and/or writing data on data storage media, such as the tape cartridges 91. Additionally, the library comprises at least one, and preferably a plurality of, transfer stations 93 with the data storage file system 10 of FIG. 1 for providing data transfer with respect to the data storage cartridges 40. Both the tape cartridges 91 and the data storage cartridges 40 are stored in storage shelves 95. The various cartridges may be stored in a segregated manner or may be stored randomly throughout the storage shelves. A typical automated data storage library also comprises one or more input/output stations 97 at which a cartridge may be received or delivered. A robot accessor 98, including a gripper 99, grips and transports a selected cartridge 91 or 40 amongst a storage shelf 95, an input/output station 97, a transfer station 93 and/or a data storage drive 92. The automated data storage library robot accessor may also include a media sensor 96. The media sensor 96 may comprise a label reader, such as a bar code scanner, or a reading system, such as a smart card or RF (radio frequency) reader, or other similar type of system, which is able to identify the cartridge, such as by means of its volume serial number, or VOLSER. As one example, the VOLSER may comprise a label placed on the cartridge which is read by a bar code reader. As another example, the VOLSER may be in recorded in an RF chip in the cartridge which is read by an RF receiver.

An automated data storage library may be capable of storing tape cartridges having differing formats for storing data, optical cartridges having differing formats for storing data, and may be capable of storing alternative media, such as optical or tape media, or various libraries or drives may be coupled to a host system 14 of FIG. 1. The ability to provide random access of a random access medium 11, such as the magnetic disk drive 12 in a cartridge 40, provides the capability for quick access to data, and removable data storage media provides low cost, high reliability storage, and archivability for the data. However, the library and the host systems coupled to a library are typically arranged to access, write and read data only in the format of removable media. Optical disk cartridges may comprise write once formats, e.g., WORM, or rewritable formats, and may store data in a linear sequential format. Magnetic tape cartridges store data in a linear sequential format and access data by unwinding the tape from one reel and winding it onto another reel. The linear sequential format may comprise a continuous stream of data, or may comprise data blocks of variable length, or other formats. As an example, the IBM 3590 tape drives employ device blocks of one or more records arranged in a linear sequence, and each has a header identifying the device block.

Thus, it would be advantageous to provide the random access speed of a magnetic disk drive to information writable and readable by hosts as though it were stored on magnetic tape or on optical disk, such that the host systems do not require reprogramming to handle the random access media, and, expecting a certain format, will use normal commands.

The present invention provides methods, data storage file systems, and random access media, which may be removable, for providing a mapping structure for storing data of any of various formats on a random access medium, and for providing a structure for storing data of a linear sequential format on a random access medium.

In one embodiment, referring to FIG. 1, the medium, such as of a magnetic disk drive, has a plurality of equal sized logical sectors 25 as a smallest single writeable/readable unit, and the logical sectors are sequentially numbered. As is understood by those of skill in the art, the physical sectors 25 are not necessarily in sequential order, but instead, various sectors may be considered "bad", and the disk drive 12 replaces a bad sector with a spare sector, such that the physical sequence of logically sequentially numbered sectors may skip around the media 11. Thus, in one embodiment, the assumption of the present invention is that the device 12 is a logical collection of equal sized sectors, numbered "0"–"n" in logical sequence without gaps, and that the physical device 12 does any remapping to replace the bad sectors.

In an embodiment of the present invention for writing and reading data in any of multiple formats, and for providing error recovery information for restoring access to data storable in any of multiple formats employs three levels of constructs.

Figure 5:
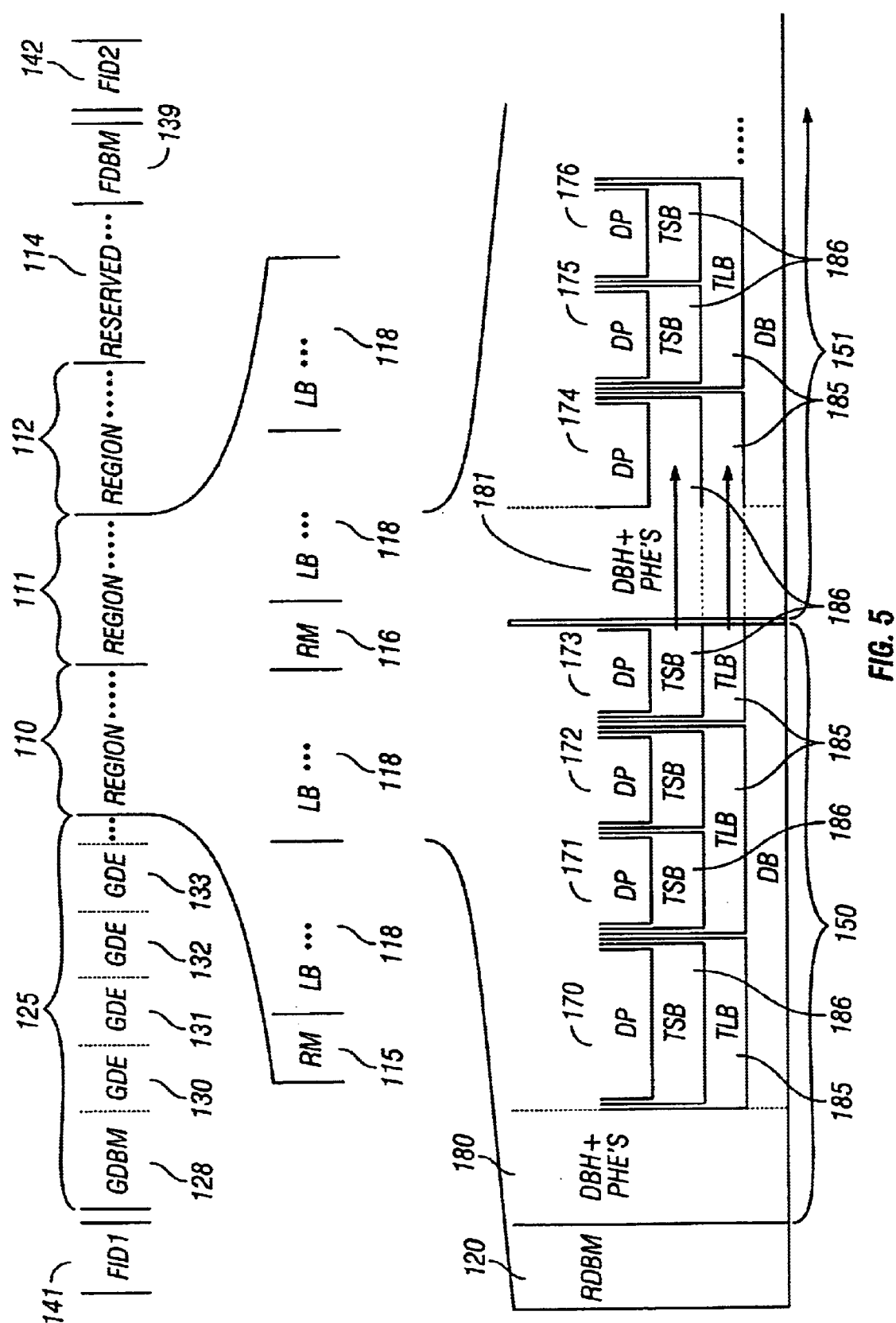
FIG. 5 is a diagrammatic representation of a plurality of embodiments of format constructs of the present invention as recorded on a random access medium of FIG. 1.

Referring to FIG. 5, a third level construct is recorded comprising at least one region 110, 111, 112 for writing and reading data in one of the various formats. Each region can be a different format, or an entire random access media may comprise a single region of one format. Examples of different formats comprise optical, tape of one type, and tape of another type. As discussed above, optical disk cartridges may comprise write once formats or rewritable formats and may store data in a linear sequential format. Magnetic tape cartridges store data in a linear sequential format and access data by unwinding the tape from one reel and winding it onto another reel. The linear sequential format may comprise a continuous stream of data, or may comprise data blocks of variable length, or other formats.

The layout of the regions can be media or usage related, as determined by the user. For example, one region may comprise a high performance area of the media 11, and another region may comprise a large area with reduced performance. Unused areas of the media may be considered as reserved areas 114.

In accordance with an aspect of the present invention, each region has an identification of the region in terms related to the specific format of the data. In one embodiment, the region identification in terms related to the specific format is provided in a region device block map "RDBM" 115, 116 and is provided related to the sequentially numbered logical sectors 25 of FIG. 1. The data is written in the designated format, for example, in logical blocks 118. As one example, the logical blocks 118 may be algorithmically related to the sectors 25 of FIG. 1, such as 2 sectors for each logical block 118. In this example, the "RDBM" may provide only the beginning and end points of the region in terms of the sequentially numbered logical sectors 25 of FIG. 1, and a mapping algorithm employed to locate a desired logical block 118.

In the case of a linear sequential format, such as a magnetic tape format which employs sequential device blocks of variable lengths, such as the IBM 3590, the identification of the format comprises the beginning points of all the device blocks of the region, and is provided in a region device block map "RDBM" 120.

There is at least one "RDBM" 115 or "RDBM" 120 in each region, and a region may comprise more than one "RDBM". As an example, a region may comprise a large number of the sectors of the random access medium, and a second or third "RDBM" may be employed to provide a subdivided structure for providing access to data of the region. As another example, an "RDBM" may comprise a fixed format, having a fixed number of device block pointers available. If enough device blocks are written, so that all the device block pointers are utilized, another "RDBM" is required to provide device block pointers for additional device blocks.

In accordance with another aspect of the present invention, a second level construct is recorded comprising a global device block map 125, with a header area "GDBM" 128 and having at least one global device block element "GDE" 130–133 for each region. Additionally, each region may be identified by a global device map index number, called "GDI". Each global device block element identifies the bounds of the data recorded in the corresponding region in terms of the sequentially numbered logical sectors 25 of FIG. 1. As any region 110–112 is expanded or reduced in size, or as regions are added or deleted, the corresponding GDE 130–133 is updated or added or deleted, and the "GDBM" is updated to designate the GDE's. The GDE indicates the starting point and size of the region in terms of the logical sectors, and may comprise format specific information, e.g., for performing high speed locates or for rebuilding an RDBM. The allocation of the logical sectors to a region may be statically determined at an initial format time and used as needed, such that the starting point and size of the region may be managed dynamically as used.

In accordance with another aspect of the present invention, a format device block map "FDBM" 139 is provided which comprises the initial header area of the GDBM 128. The "FDBM" 139 remains unchanged during normal use and is not updated. In one embodiment, the FDBM includes the initial portion of each GDE, identifying the starting point of each region. Thus, if a region is added, or the starting point of a region is changed, the FDBM must be updated. This comprises backup information for region boundaries only to allow a reconstruction of the GDBM. It is not updated frequently in order to reduce the possibility of losing both the "FDBM" and the "GDBM" while being updated at the same time. Thus, the GDBM is considered a working area and is updated periodically based on updates to the format or allocation, and not on each write. In contrast, the FDBM comprises the initial "raw" format, identifying region boundaries only and is rarely updated, to allow for recovery. The second level construct, e.g., comprising the global device block map 125 and the format device block map 139, may be located anywhere on the medium as determined in the initial formatting process. In the example, the global device block map 125 is located toward the beginning of the logical sectors of the medium, and the format device block map 139 is located toward the rear of the logical sectors of the medium.

A first level construct is recorded comprising at least one format identifier "FID1" 141, and preferably with a second, redundant format identifier "FID2" 142. The format identifiers each have a pointer indicating the location and size of the second level construct, the global device block map, in terms of the sequentially numbered logical sectors 25 of FIG. 1. Further, the format identifiers comprise a pointer to itself and to the other format identifier. Still further, the format identifiers may comprise pointers to the user area (regions) and any reserved area(s). Again, the pointers are in terms of the sequentially numbered logical sectors. The format identifiers are located at specific locations of the random access medium and comprise a fixed structure, such that no searching of the medium or of the structure is required, speeding access to the data.

An example of a WORM optical disk format comprises a region beginning with a control section setting forth the parameters of the data, followed by a sequence of optical logic blocks 118 of data.

An example of magnetic disk data having some random access aspects comprises that of the high capacity floppy disk, such as commercially available from Iomega Corp., having a specific format.

Thus, random access is conducted efficiently to the defined regions, while the format of the data may be employed to handle the data and to write and read the data, without requiring extensive conversion. Further, mapping is provided for a data storage format in a context other than that of the random access medium, so that the data may be handled and written and read in that context using normal commands. Still further, the multiple levels provide alternate paths to the access information so that any damaged or non-written tables or headers may be repaired or recovered.

Still referring to FIG. 5, in another embodiment directed specifically to data in the linear sequential format, a construct, such as the third level construct, is recorded comprising at least one region for writing and reading data in the linear sequential format, such as region 110–112. Each region has a region device block map "RDBM" 120 which identifies an association between the format specific address method and the region in terms of the sequentially numbered logical sectors 25 of FIG. 1.

Figure 6:
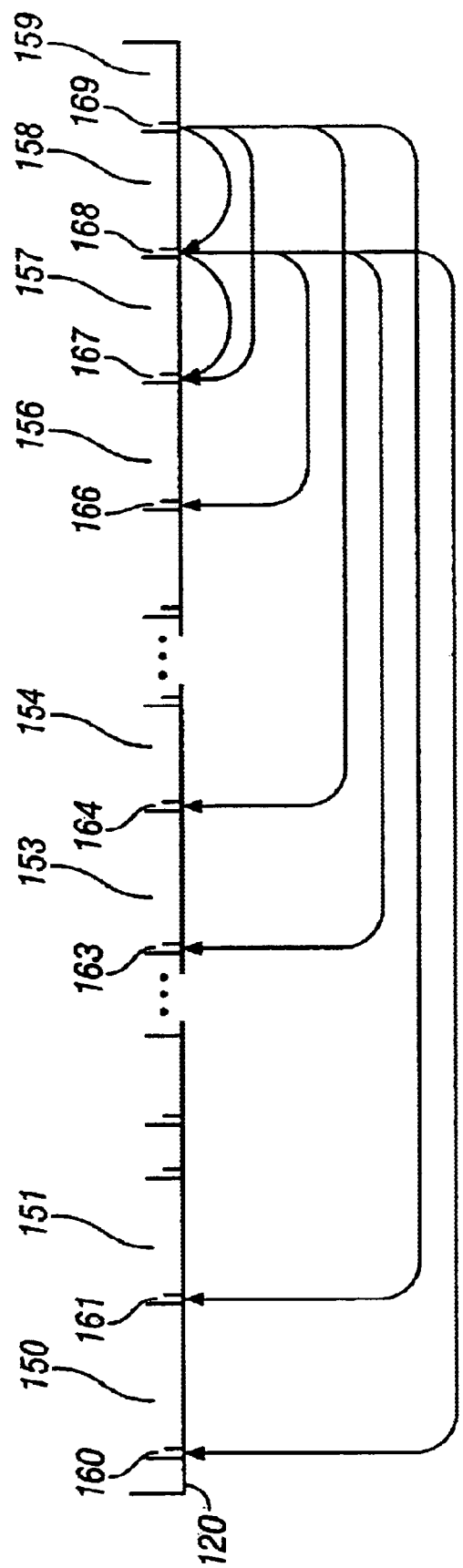
FIG. 6 is a diagrammatic representation of a format construct of FIG. 5 for a linear sequential format.

Referring additionally to FIG. 6, the data of the linear sequential format is organized in a stream of sequential device blocks 150–159 of variable lengths for writing and reading. The format is an established tape format for providing good space utilization. The RDBM 120 has a regional DBM element "RDE" for each of the device blocks 150–159, which RDE has a forward pointer to the device block. The forward pointer is in terms of the logical sectors 25 of FIG. 1, thereby relating the device blocks to the logical sectors.

In accordance with another aspect of the present invention, each device block has a device block header 160–169 with a plurality of backwards references, each referencing a separate previous device block in the stream.

In accordance with an aspect of the present invention, one of the backwards references is to an immediately adjacent previous device block, for example, device block header 169 has a backwards reference to the block header 168 of the immediately adjacent device block 158, and device block header 168 has a backwards reference to the device block header 167 of the immediately adjacent device block 157. Additionally at least one of the references is to a closely adjacent previous device block. As one example, device block header 169 has a backwards reference to the block header 167 of the closely adjacent device block 157, and device block header 168 has a backwards reference to the device block header 166 of the closely adjacent device block 156. As another example, device block header 169 has a backwards reference to the block header 164 of the closely adjacent device block 154, and device block header 168 has a backwards reference to the device block header 163 of the closely adjacent device block 153. Lastly, at least one of the references is to a distant previous device block. As an example, device block header 169 has a backwards reference to the block header 161 of the distant device block 151, and device block header 168 has a backwards reference to the device block header 160 of the distant device block 150.

The pointers are in terms of device block sequence numbers, in terms of the linear sequential format, and in terms of the sequentially numbered logical sectors 25 of FIG. 1. Thus, direct random access may be made from any presently read device block, to the area of a desired device block, despite the variable lengths of the device blocks.

The backwards references may be called "sliding tape logical block" and "sliding disk logical block" pointers, since each sequential set of references is offset from the previous or subsequent set of references by one or more device blocks. The algorithm used may not point the identical distance backwards for each reference of the set. Rather, some may slide and others may stay the same.

Referring to FIG. 5, in another aspect of the present invention, the linear sequential format data is additionally organized in a stream of sequential device packets, called "DP", 170–176 which are no greater in size than, and none of which span a boundary between, device blocks. Further, for each of the device packets of a device block, e.g., device block 150–151, a device packet header element "PHE" is provided in the device block header "DBH" 180–181. In the instant example, the data stream comprises tape logic blocks "TLB" 185 and tape sub-blocks "TSB" 186. The device packets are defined as no greater in size than a tape sub-block 186, and additionally do not span a boundary between device blocks. Thus, device packets 173 and 174 split a tape sub-block 186 and a tape logic block 185 so as to not span a boundary between device block 150 and device block 151, such that device packet 173 is in device block 150, and device packet 174 is in device block 151. The respective device packet header elements "PHE" are thus also provided in the respective device block headers "DBH" 180 and 181 of the respective device blocks 150 and 151. The device packet header elements each comprises an indicator of the linear sequential format data of the device packet, in terms of the linear sequential format.

By grouping the device packet header elements together in the device block headers, and, further, by having the headers of all types contain the needed information separate from user data, the data may be traversed without reading the data, as will be discussed.

As specific examples, a tape logic block 185 has one or more sub-blocks 186, and may vary in size upwards from one byte, and a sub-block 186 has one or more device packets and may vary in size from the size of a tape logic block 185 to a certain maximum value, such as 256 kb, whichever is smaller. The device packets are defined as comprising a sub-block 186 or as a portion of a sub-block to prevent spanning a device block boundary. Hence, having more than two device packets in a sub-block is unlikely.

As the result, data is stored in the context of a linear sequential format, which is a context other than that of a random access medium, and the present mapping allows the data to be handled and written and read in that linear sequential format context using normal commands.

Figure 7:
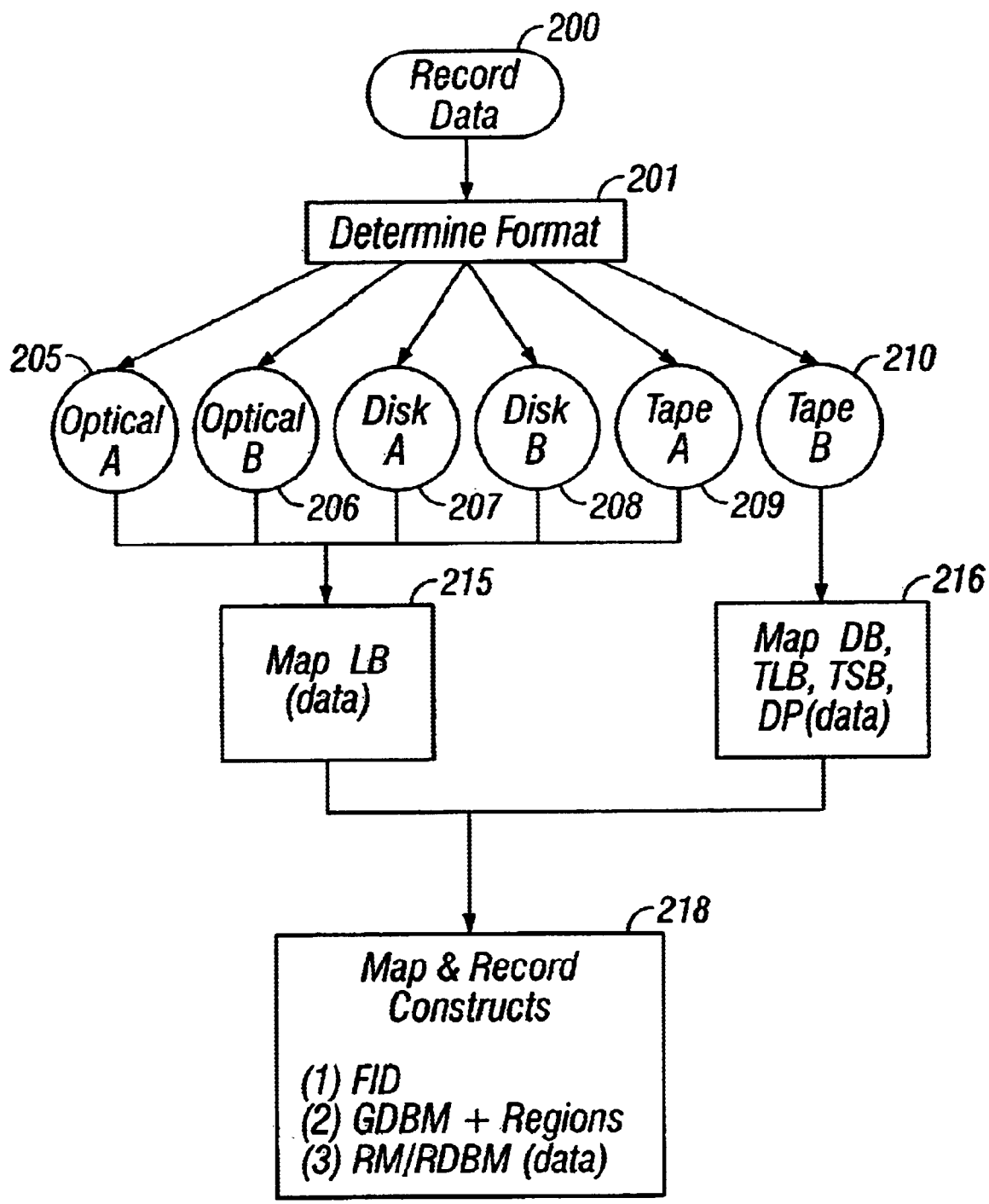
FIG. 7 is a flow chart depicting an embodiment of the method of the present invention.

Referring to FIG. 7, an embodiment of a method of providing a mapping structure is illustrated in accordance with the present invention. The method begins in step 200, and step 201 comprises determining the format in which the data is to be written. Typically, the choice of format is directed by the host system 14 of FIG. 1. Thus, the data will be stored in the format expected by the host system.

As examples, six formats are illustrated. An optical format "A" 205 may comprise a write once read many (WORM) format. Another optical format "B" 206 may comprise a rewritable optical format, such as magneto-optic. A disk format "A" 207 may comprise that of a high capacity floppy disk, as discussed above, and another disk format "B" 208 may comprise that of a removable hard disk which can be removed from a disk drive mechanism, also as discussed above. A tape format "A" 209 may comprise that of a magnetic tape "streamer", as discussed above.

The illustrated tape format "B" 210 comprises the linear sequential format discussed above, such as that of a magnetic tape cartridge, of data blocks of variable length.

Once the format has been determined, for formats other than the linear sequential format, the logic blocks of data are mapped in step 215 with the normal formatting of the data.

If the format for writing and reading data for at least one region comprises the linear sequential format of step 210, the method proceeds to step 216 to organize the data of the linear sequential format in a stream of sequential device blocks of variable lengths for writing and reading. The data may also be organized into tape logic blocks 185 and tape sub-blocks 186 of FIG. 5, in accordance with the normal formatting of the data. Additionally, step 216 comprises organizing the linear sequential format data in a stream of sequential device packets, no greater in size than, and none of which span a boundary between, the device blocks. Further, for each of the device packets of a device block, a device packet header element is placed in the device block header.

Also in step 216, or alternatively in step 218, the backwards references are provided in each device block having a device block header, each referencing a separate previous device block in the stream, one of the references to an immediately adjacent previous device block, at least one of the references to a closely adjacent previous device block, and at least one of the references to a distant previous device block. As discussed above, the device blocks have sequence numbers, and the provided backwards references are in terms of the device block sequence numbers, in terms of the linear sequential format, and in terms of the sequentially numbered logical sectors.

Thus, steps 215 and 216 comprise development of the user data in the desired format, and organizing the data in accordance with the region of the third level construct, and, in the case of the linear sequential format, the development of the device packet information of the third level construct of the present invention for at least one region.

In step 218 of FIG. 7, the third, second and first level constructs are generated or updated in accordance with the present invention.

The third level construct is recorded comprising at least one region for writing and reading data in one of the various formats of steps 205–210, each region having, preferably in a header "RDBM" 115 or an "RDBM" 120 of FIG. 5, an identification of the one format and identification of the region in terms specific to the format and in terms of the sequentially numbered logical sectors 25 of FIG. 1. One example comprises the references to each of the device blocks. There is at least one "RDBM" 115 or "RDBM" 120 in each region, and a region may comprise more than one "RDBM". As an example, a region may comprise a large number of the sectors of the random access medium, and a second or third "RDBM" may be employed to provide a structure allowing more precise random access to data of the region.

In the case of the linear sequential format, the third level construct additionally comprises, in each region of the linear sequential format data, providing a plurality of backwards references to previous device blocks in a like manner as the backwards references of step 216, discussed above.

Still referring to FIG. 7 and step 218, the second level construct comprises recording a global device block map 125 of FIG. 5 having a "GDBM" 128 with at least one global device block element "GDE" 130–133 for each region 110–112 of the medium. The second level construct comprises identifying each of the regions, e.g., regions 110–112 of FIG. 5, by an index number, or GDI.

As one example, the media is divided into regions at an initial formal time, and the GDE's are established in the GDBM. The regions are thus static, but their use is dynamic. The GDE's are arranged in sequence, such that the index numbers are implicit, based on the indexed location in the sequence of GDE's.

An available GDE is claimed for each newly written region. If, instead, new space is being allocated to an existing region, the existing GDE is updated. Each global device block element "GDE" identifies bounds of the data recorded in the corresponding region in terms of the sequentially numbered logical sectors 25 of FIG. 1.

In another aspect of the present invention, the random access medium is arranged in sets of regions. As one example, regions may have differing formats, and those regions which have a common format comprise a set. As another example, a set of regions may be reserved for related data. The regions of a set comprise a "partition", which is identified by a partition identifier 279 of FIG. 11, and the sequential ordering of the regions in a partition is indicated by a region sequence number 275 of FIG. 11, as will be discussed.

A format device block map 139 in FIG. 5 is generated at the initialization of the random access medium, and remains fixed in normal use so as to provide a vehicle for recovery of the constructs. This structure contains information of the location and size of each region, but not usage information.

Still referring to FIG. 7 and step 218, the first level construct comprises at least one format identifier 141, 142 of FIG. 5, having a pointer indicating the location and size of the second level construct, wherein the location and size are in terms of the sequentially numbered logical sectors 25 of FIG. 1. Preferably, the step of recording a first level construct comprises recording two format identifiers, e.g., "FID1" 141 and "FID2" 142, located respectively at a lowest numbered of the sequentially numbered logical sectors, and at a highest numbered of the sequentially numbered logical sectors. The dual format identifiers thereby provides a level of redundancy.

Additionally, each of the format identifiers comprises pointers to itself, the other format identifier, and any reserved area, such as reserved area 114 in FIG. 5. The format identifiers may also identify the user area.

Figure 8A:
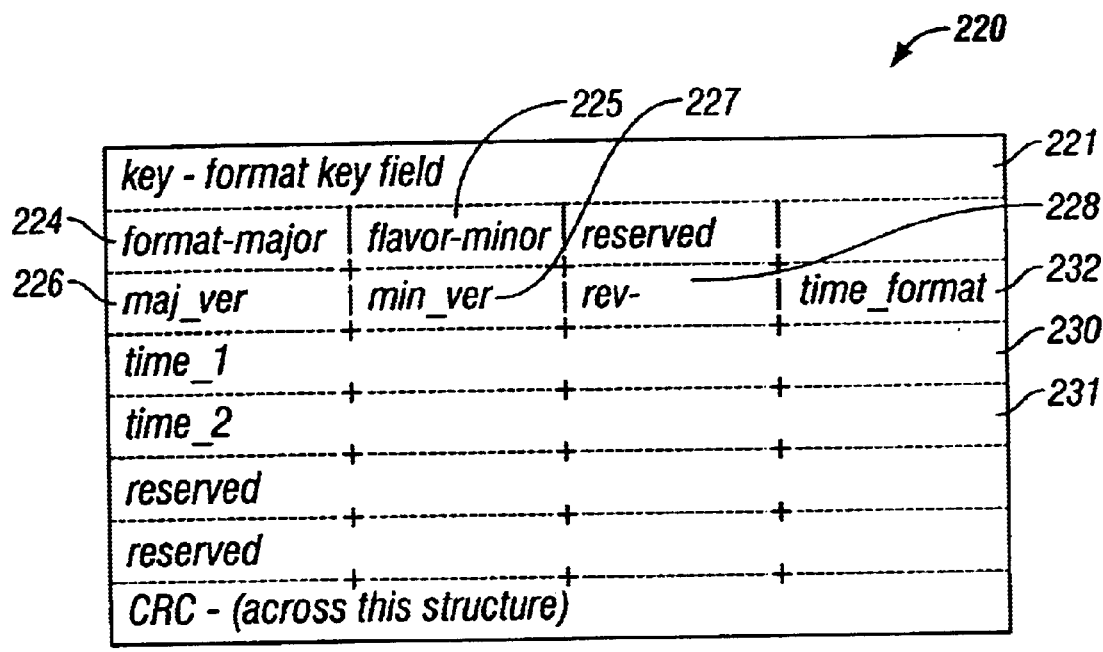
FIGS. 8A, 8B and 8C are diagrammatic representations of embodiments of headers employed in the format constructs of FIG. 5.
Figure 8B:
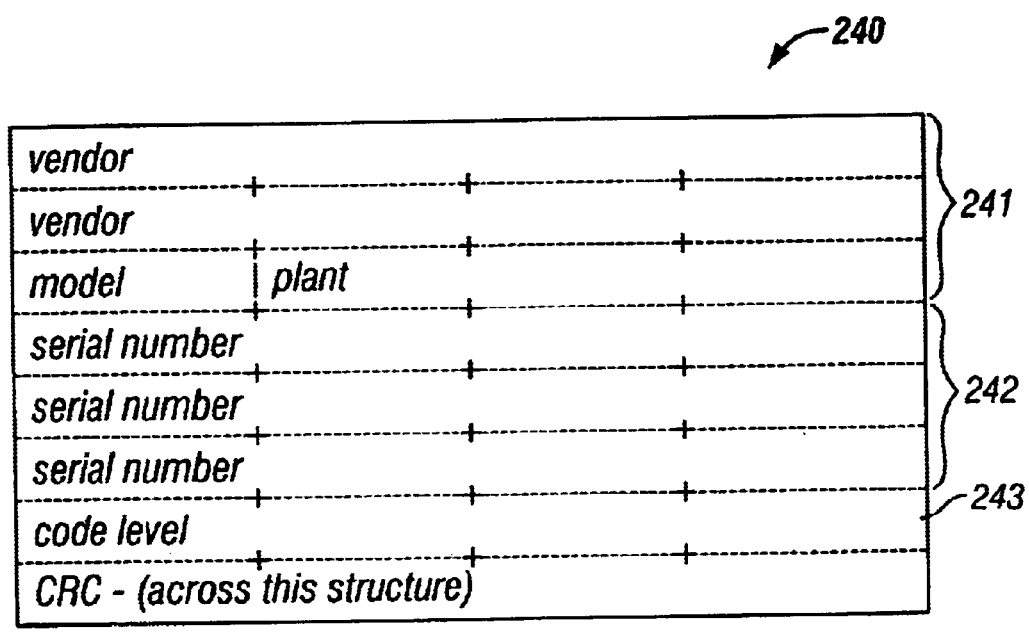
Figure 8C:
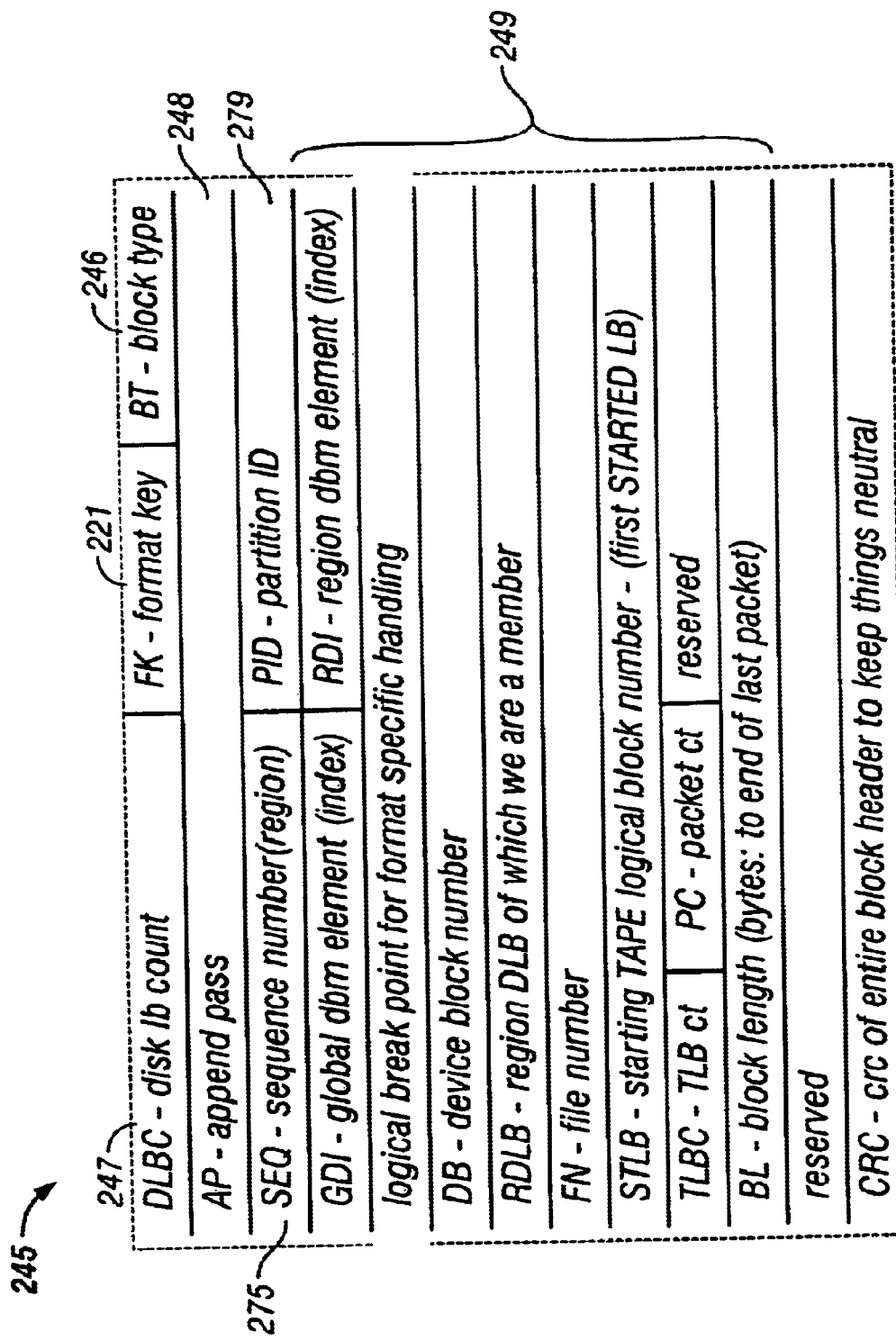

FIGS. 8A, 8B, and 8C comprise examples of basic header information for each of the headers of the constructs of step 218. Some of the information is related to the headers themselves, while some is related to the construct which logically immediately follows the header. The structure of the basic header information of FIGS. 8A and 8B is fixed to allow quick determination of the type of header that is being read, and specific information about the header. The information of FIG. 8C is related to the construct.

As an example, FIG. 8A comprises type 1 information 220, which comprises fixed information such as a format key field 221, which is an arbitrary constant that comprises a "signature", differentiating the logical construct, e.g., from data, and indicating whether the construct is a compatible one. Other fields 224–228 may comprise fields which describe the format of the header, the flavor of the format, and the versions and revisions of the format at initialization. Other fields may be provided for debug or other applications, such as fields 230–232 which describe the time of various actions with respect to the header, and describe the type of time measurement.

As another example, FIG. 8B comprises type 2 information 240, which comprises variable information such as a field 241 to identify a vendor or vendors, for example, of the data storage file system 10 and/or of the data storage recording system 17 of FIG. 1 which initially formatted or which updates the header. Other fields 242, 243 may identify the serial number of the data storage file system 10 and/or of the data storage recording system 17, and the code level when the header was initially formatted or updated.

The information 245 of FIG. 8C, primarily, in field 246, identifies the type of construct that follows. As examples, the block type field may indicate that the construct is a second level construct, such as a "GDBM" 128, or a third level construct, such as a "RDBM" 115, a "RDBM" 120, or a "DBH" 180, all from FIG. 5.

The size of the construct is indicated in field 247 in terms of the number of logical sectors, or the disk logical block count. The format key field 221 is repeated, and an append pass field 248 may be provided to allow the identification of the most recent change to the data. The remaining fields are dependent on the type of header. If the header is for a third level construct where the regions are partitioned as discussed above, field 279 identifies the partition, and field 275 identifies the sequence of the region within the partition. Fields 249 identify the location of the header in terms related to the construct type and its location within other constructs.

Figure 9:
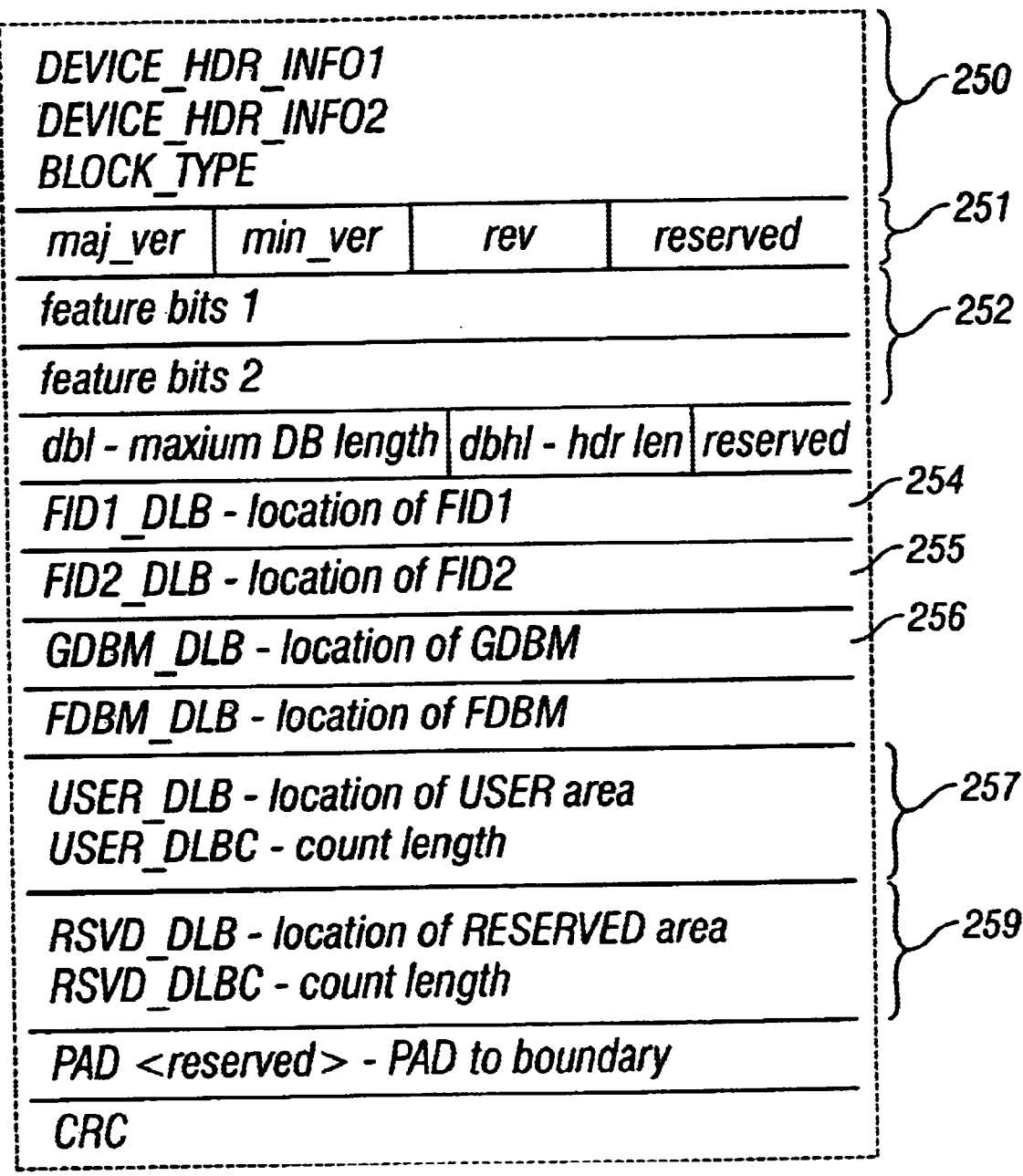
FIG. 9 is a diagrammatic representation of an embodiment of a first level construct in accordance with the present invention in the format constructs of FIG. 5.

FIG. 9 illustrates an example of a first level construct format identifier, such as format identifier 141. The initial field 250 may comprise the header information 220, 240, 245 of FIGS. 8A, and 8B, and 8C, for example, to identify the header as a FID and to provide other information as discussed above, for example, to describe previous variable information for error tracking, or to describe the size of the FID in terms of bytes or other measurements.

The format identifier may comprise information 251 regarding the specifics of the current format of the FID, comprising, for example, fields which describe the format of the header, the flavor of the format, the versions and revisions of the format. Other information 252 may comprise specific features that are implemented by the format identifier and in the constructs for the random access medium.

Further, the format identifiers comprise a pointer 254, 255 to itself and a pointer 254, 255 to the other format identifier. Additionally, the format identifiers may give the location of the second level construct, the global device block map 256. Still further, the format identifiers may point to the location and size of the user area (regions) 257. Still further, the format identifier may provide the location and size of any reserved area(s) 259. As discussed above, the pointers are in terms of the sequentially numbered logical sectors.

Figure 10:
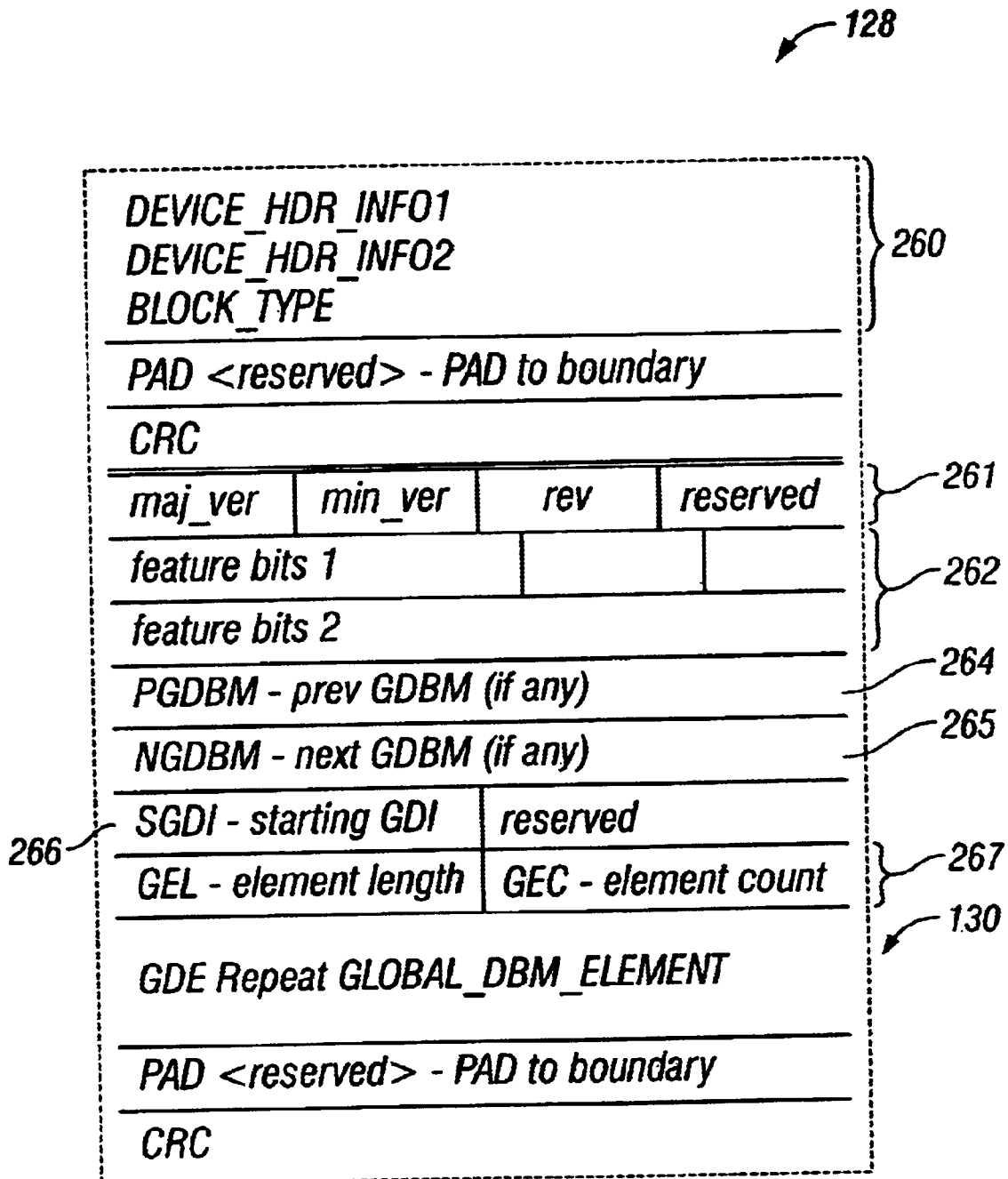
FIGS. 10 and 11 are diagrammatic representations of an embodiment of a second level construct in accordance with the present invention in the format constructs of FIG. 5.
Figure 11:
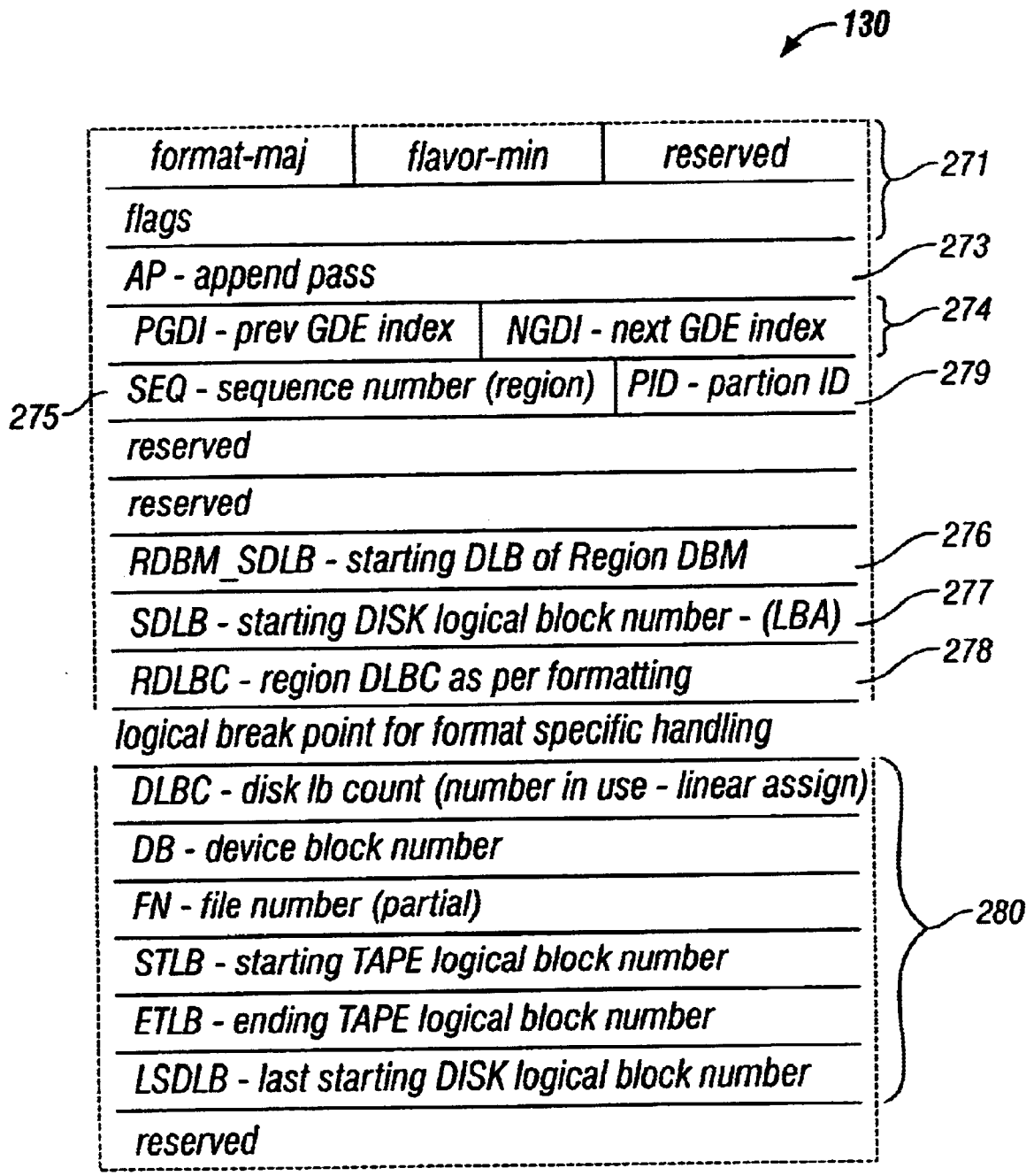

An example of a second level construct, the global device block map 128 of FIG. 5, is illustrated in FIGS. 10 and 11.

The initial field 260 may comprise the header information 220, 240, 245 of FIGS. 8A, 8B, and 8C, for example, to identify the header as a global device block map and to provide other information as discussed above, for example, to describe variable information for error tracking, or to describe the size of the GDBM 128 and included GDE(s) 130–133 of FIG. 5 in terms of bytes or other measurements.

The global device block map may comprise information 261 regarding the specifics of the current format of the global device block map comprising the GDBM 128. For example, fields may be provided which describe the format of the header, the flavor of the format, the versions and revisions of the format. Other information 262 may comprise specific features that are implemented by the global device block map.

Further, as an option, the GDBM may comprise a pointer 264 to the previous GDBM, if any, and a pointer 265 to the next GDBM, if any. Information 266 indicates the GDE index, the starting point of the first of the global DBM elements (GDE) 130–133, and information 267 indicates the length of each global DBM element and the number of global DBM elements. This allows rapid access to the information of the desired GDE. The global DBM elements then follow. As discussed above, a global DBM element is provided for each region 110–112 within the purview of the GDBM, which preferably comprises the entire random access device.

An exemplary GDE 130 is illustrated in FIG. 11. The global DBM element may comprise information 271 regarding the specifics of the type of region that is represented by the global DBM element, which for example comprises one of the formats 205–210 depicted in FIG. 7.

Information 273 may comprise specific tape format related information of the last append to data in the represented region. Appends are well known to those of skill in the tape related art.

Information 274 indicates the index, "GDI", of the previous logical global DBM element, if any, and of the next logical global DBM element, if any, 130–133 which comprise a common set of regions.

As discussed above, the second level construct, the global DBM element 130 identifies the represented region, e.g., regions 110–112 of FIG. 5, by its index, "GDI", and provides its location. In the example, the GDE provides the location of the third level construct region device block map "RDBM" 115 or "RDBM" 120 of FIG. 5 in information 276, and provides the location of the region 110–112 in information 277, both provided in terms of the sequentially numbered logical sectors 25 of FIG. 1, also called "disk logical blocks" or DLB.

Information 278 comprises the count, or number, of logical sectors allocated to the region, providing the size measurement.

As discussed above, a common set of regions are arranged in a partition. Fields 279 and 275 are employed to manage the sets of regions. A common set of regions for example, of the same format, may be separated by other regions, and may be arranged out of sequence. Information 279 comprises a partition identifier and provides an identification of the partition of the region, and information 275 comprises a region sequence number and provides the sequence of the region in the ordering of the partition.

Space for format specific information 280 is provided to allow the user to employ the information to manage high performance access to the user data in the represented region, and to provide backup information for the region device block map 115, 120.

Figure 12:
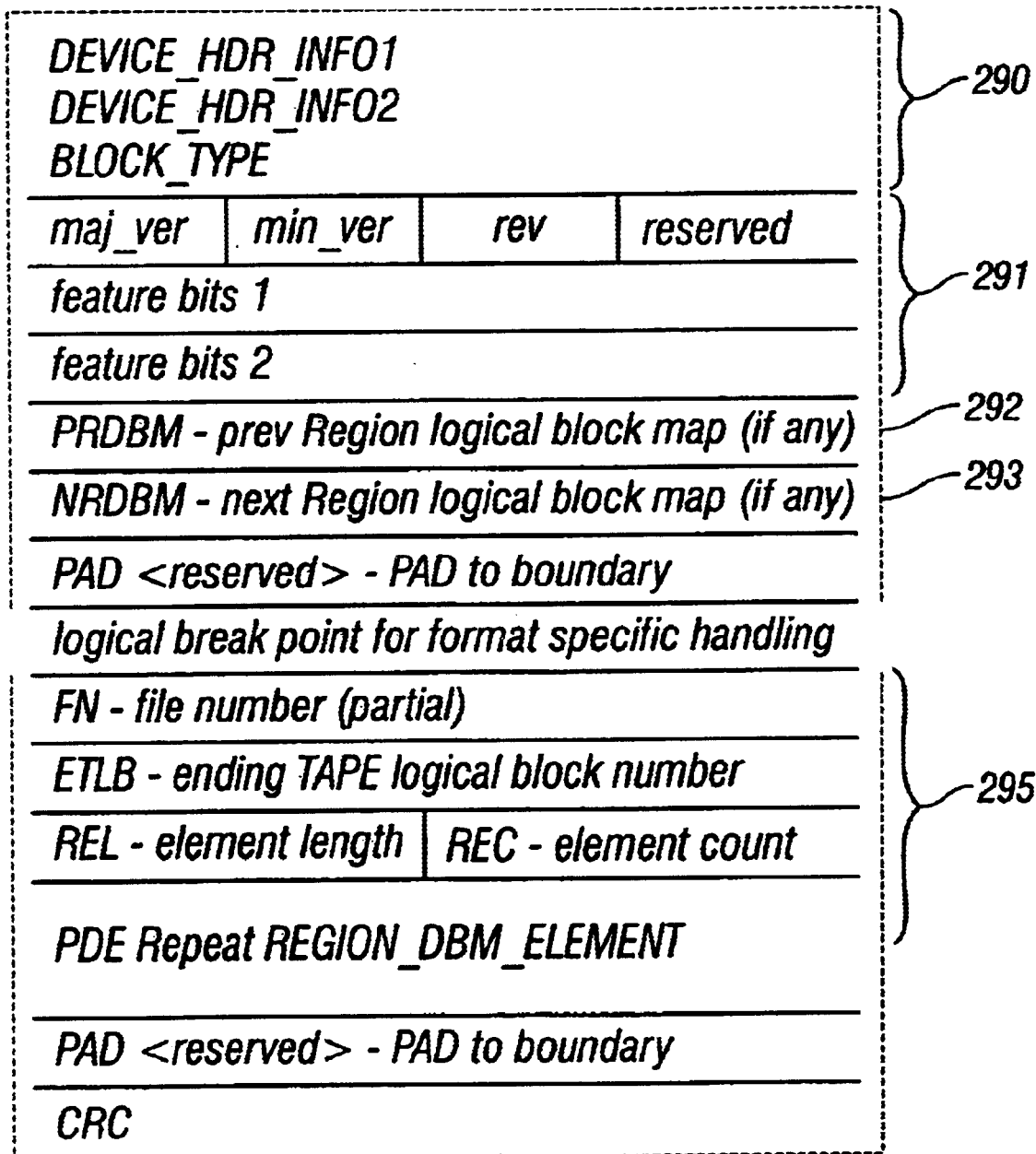
FIG. 12 is a diagrammatic representation of an embodiment of a third level construct in accordance with the present invention in the format constructs of FIG. 5.

The third level construct, comprising the region device block map "RDBM" 115, 120 for the associated region 110, 111, 112 of FIG. 5 is illustrated in FIG. 12.

The initial field 290 may comprise the header information 220, 240, 245 of FIGS. 8A, 8B, and 8C, for example, to identify the header as a region device block map and to provide other information as discussed above, for example, to describe variable information for error tracking, or to describe the size of the RDBM 115, 120 in terms of bytes or other measurements.

The RDBM comprises information 291 regarding the specifics of the current format of the RDBM and the region, comprising, for example, fields which describe the versions and revisions of the format and specific features that are implemented by the user in the region.

As discussed above, a region may comprise more than one RDBM. If so, the RDBM comprise a pointer 292 to the previous RDBM and a pointer 293 to the next RDBM, if any. These pointers may contain references to the previous or next RDBM in a logically sequential common region.

Space for format specific information 295 is provided to allow the user to employ the information to access the user data in the represented region, and to provide backup information for the GDE 130–133 of FIG. 5. That information identifies the region in terms of the sequentially numbered logical sectors 25 of FIG. 1, and in terms of the specific format of the data. As discussed above, in one embodiment, the data is written, for example, in logical blocks 118, and in the case of a linear sequential format, the data is written in sequential device blocks 150 of variable lengths, both as illustrated in FIG. 5.

Figure 13:
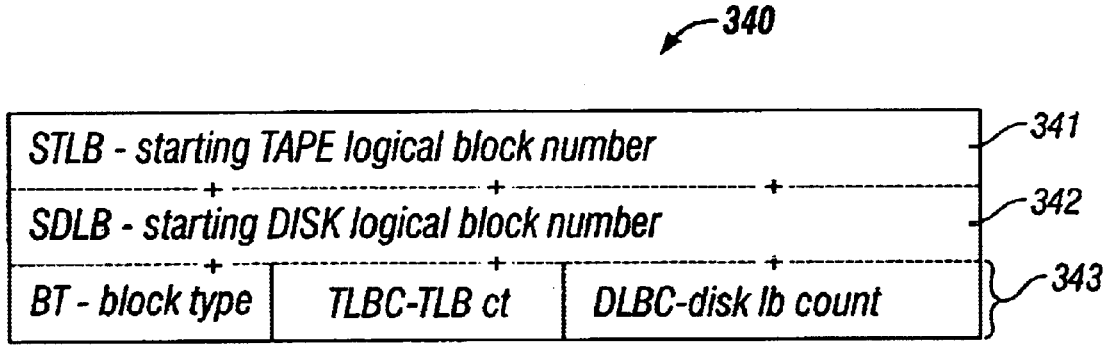
FIG. 13 is a diagrammatic representation of a specific example of a mapping element of the third level construct of FIG. 12.

FIG. 13 comprises an implementation of a reference 340 to the format of the region called a region device element, or "RDE". One or a series of RDE's may be provided. As discussed above, if the logical blocks are algorithmically related to the logical sectors, the RDE may identify the beginning and end points of the region and identify the algorithmic relationship. Additionally, the RDE may provide specific information about each logical block, such as if the block has been written. The beginning and end points are in terms of the sequentially numbered logical sectors 25 of FIG. 1.

If the format employs a number of variable sized logical blocks, such as the linear sequential format data, the RDE corresponds to a device block, e.g., device block 150 of FIG. 5, and all the device blocks are described by associated RDE'S. A region may have a large number of device blocks and therefore more RDE entries than are in a single RDBM. In this case, another RDBM is provided for the region, each RDBM describing a portion of the region.

The implementation of an RDE 340 of FIG. 13 is for the device blocks 150 of the linear sequential format of FIG. 5. The RDE in the example comprises information providing the starting location of the referenced device block by tape logic blocks 341, which is in terms of the linear sequential format. The RDE also references the starting location of the referenced device block in terms of disk logical blocks 342, which is in terms of the sequential numbered logical sectors 25 of FIG. 1. Other information 343 may comprise information about the referenced device block, such as the type of device block that is being referenced. Other information may comprise its size in terms of logical sectors 25 of FIG. 1, and in terms of tape logic blocks 185.

Thus, the third level construct region is arranged for the writing and reading of data in one of various formats, and the RDBM and RDE identify the region in terms specifically related to the one format of the data, and in terms of the sequentially numbered logical sectors.

Figure 14:
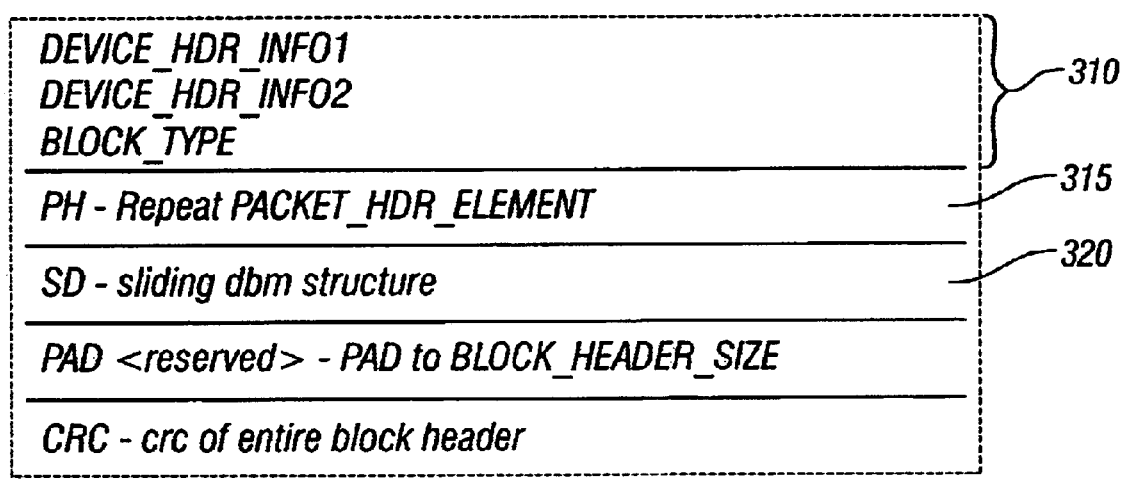
FIGS. 14, 15 and 16 are diagrammatic representations of an embodiment of data structures and mapping a third level construct in accordance with the present invention in the format constructs of FIG. 5.
Figure 15:
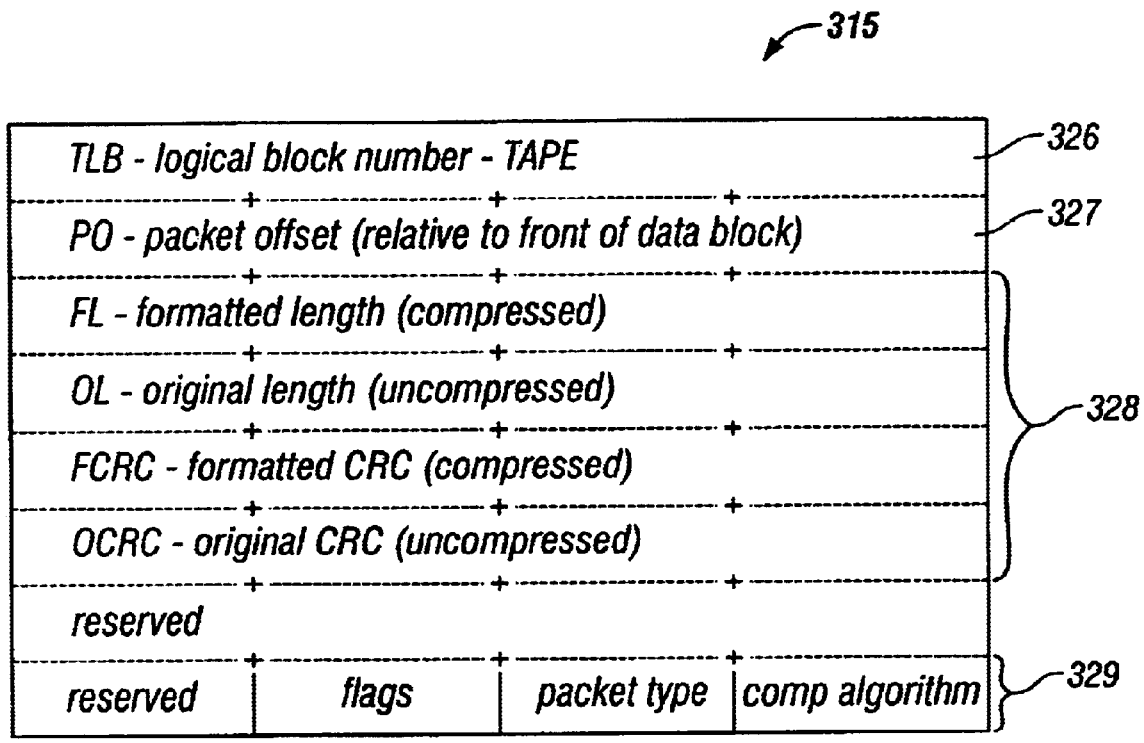
Figure 16:
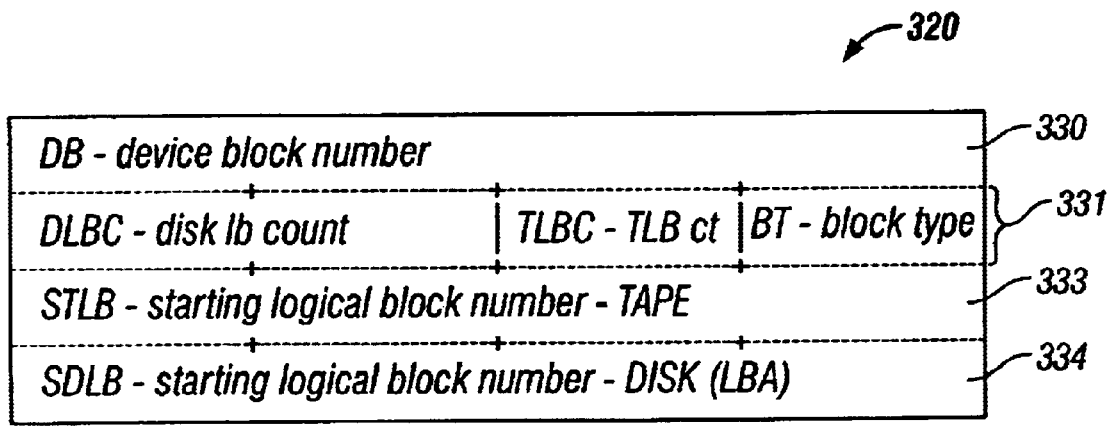

FIG. 14 comprises an example a device block header, FIG. 15 comprises an example of a packet header element, and FIG. 16 comprises an example of a sliding block reference structure, all of an alternative embodiment 180 of a third level construct in accordance with the present invention, for organizing data of the linear sequential format in a stream of sequential device blocks of variable lengths 150, 151, as depicted in FIG. 5, each having a device block header and packet header elements 180, 181.

Referring to FIG. 14, device block header and packet header elements 180 is employed as the example. The initial field 310 of the device block header and packet header elements 180 may comprise the header information 220, 240, 245 of FIGS. 8A, 8B, and 8C, for example, to identify the header as a device block header map and to provide other information as discussed above. Additional header information fields may be provided, for example, to describe previous variable information for error tracking, or to describe the size of the device block header in terms of bytes or other measurements.

As discussed above, for the linear sequential format, the data may also be organized into tape logic blocks 185 and tape sub-blocks 186 of FIG. 5, in accordance with the normal formatting of the data. Additionally, in accordance with the present invention the linear sequential format data is organized in a stream of sequential device packets 170–176, no greater in size than, and none of which span a boundary between, the device blocks. Further, for each of the device packets of a device block, a device packet header element is placed in the device block header.

Thus, the packet header elements 315 are provided in accordance with an aspect of the present invention. In accordance with another aspect of the present invention, sliding DBM references 320 are provided, comprising a plurality of backwards references, each referencing a separate previous device block in the stream, one of the references to an immediately adjacent previous device block, at least one of the references to a closely adjacent previous device block, and at least one of the references to a distant previous device block.

An example of a packet header element 315 is depicted in FIG. 15. The packet header elements are in the same order as the sequential device packets 170–176 of the data block, and each packet header element references a corresponding device packet. The packet header element identifies, in information 326, the tape logical block 185 of FIG. 5 in which the corresponding packet resides. Information 327 identifies the offset of the corresponding device packet.

Information 328 may indicate other information about the corresponding packet, such as the formatted compressed length, the uncompressed length, and the values of the compressed and uncompressed CRC's. Information 329 may provide still further information about the corresponding packet, such as flags to indicate whether or not the packet is in a tape block 185 or sub-block 186 which spans a device block boundary, and indicates which side of the boundary is formed by the device packet. Additionally, the information 329 may indicate the content of the device packet, for example, whether the packet is data or a file mark, as is known to those of skill in the art, and indicating an algorithm employed with respect to the data. Thus, the device packet header provides an indicator of the linear sequential format data of the corresponding device packet, in terms of the linear sequential format.

All information about the packets and backwards references is contained in the header, separate from user data. This allows the data to be logically traversed or maps rebuilt without reading any actual user data. The ability to skip over user data without reading, and having all the packet header elements for the device block in one location enhances performance in error situations.

An example of a sliding DBM backward reference 320 is illustrated in FIG. 16. As discussed above, each device block header 180 comprises a plurality of backwards references 320, each referencing a separate previous device block in the stream, one of the references to an immediately adjacent previous device block, at least one of the references to a closely adjacent previous device block, and at least one of the references to a distant previous device block. The backwards reference identifies, in information 330, the device block 150, 151 of FIG. 5 that is being referenced, in terms of the device block sequence numbers. Other information 331 may comprise information about the referenced device block, such as its size in terms of logical sectors 25 of FIG. 1, also called disk logic blocks, and in terms of tape logic blocks 185. Other information may indicate the type of device block that is being referenced.

The backwards reference provides the starting location of the referenced device block 150, 151, for example, to the device block header, and the backwards reference is by tape logic blocks 333, which is in terms of the linear sequential format, and by disk logical blocks 334, which is in terms of the sequentially numbered logical sectors 25 of FIG. 1.

Referring to FIG. 5, as an example, all of the construct information 141, 142, 125, 139, 115, 120 and 180 is separate from the user data. As the result, the user data may be logically traversed without reading the data, while searching to rebuild maps or while locating by using one or more backwards references.

Those of skill in the art understand that the specific layout of each of the headers and constructs may be modified, and that specific use of tape sub-blocks or other elements of the data is not required or may be modified.

While the preferred embodiments of the present invention have been illustrated in detail, it should be apparent that modifications and adaptations to those embodiments may occur to one skilled in the art without departing from the scope of the present invention as set forth in the following claims.

I claim:

1. A method for providing a mapping structure for storing data of any of various formats on a random access medium, said medium having a plurality of equal sized logical sectors as a smallest single writeable/readable unit, said logical sectors sequentially numbered, comprising:

recording a third level construct comprising at least one region for writing and reading data in one of said various formats, each said region having an identification of said region in terms related to said one format of said data, and related to said sequentially numbered logical sectors;

recording a second level construct comprising a global device block map having at least one global device block element for each said region, each said global device block element identifying bounds of said data recorded in said region in terms of said sequentially numbered logical sectors; and recording a first level construct comprising at least one format identifier having a pointer indicating location and size of said second level construct, said location and size in terms of said sequentially numbered logical sectors.

2. The method of claim 1, wherein said step of recording a first level construct comprises recording two said format identifiers, located respectively at a lowest numbered of said sequentially numbered logical sectors, and at a highest numbered of said sequentially numbered logical sectors.

3. The method of claim 2, wherein, in said step of recording a first level construct, each of said format identifiers additionally comprises pointers to itself and to the other said format identifier.

4. The method of claim 1, wherein said step of recording a second level construct additionally comprises each said global device block element identifying said format of said data recorded in said region, and identifying said bounds of said data in terms relating to said format.

5. The method of claim 1, wherein said one of said various formats for writing and reading data for at least one of said regions of said third level construct comprises a linear sequential format, wherein said method additionally comprises the step of:

organizing data of said linear sequential format in a stream of sequential device blocks of variable lengths for writing and reading, each said device block having a device block header with a plurality of backwards references, each referencing a separate previous device block in said stream, one of said references to an immediately adjacent said previous device block, at least one of said references to a closely adjacent said previous device block, and at least one of said references to a distant said previous device block.

6. The method of claim 5, wherein said step of recording a third level construct additionally, in each said region having said linear sequential format data, comprises providing references to all said device blocks of said region.

7. The method of claim 5, wherein said device blocks have sequence numbers, and wherein said backwards references are in terms of said device block sequence numbers, and in terms of said sequentially numbered logical sectors.

8. The method of claim 5, wherein said step of organizing said linear sequential format data additionally comprises organizing said linear sequential format data in a stream of sequential device packets, no greater in size than, and none of which span a boundary between, said device blocks; and, for each of said device packets of a device block, placing a device packet header element in said device block header.

9. The method of claim 8, wherein said device packet header elements each comprises an indicator of said linear sequential format data of said device packet, in terms of said linear sequential format.

10. A method for providing a structure for storing data of a linear sequential format on a random access medium, said medium having a plurality of equal sized logical sectors as a smallest single writeable/readable unit, said logical sectors sequentially numbered, comprising:

organizing data of said linear sequential format in a stream of sequential device blocks of variable lengths for writing and reading;

recording a construct comprising at least one region for writing and reading data in said linear sequential format, each said region having an identification of said region in terms related to said device blocks and to said sequentially numbered logical sectors; and providing each said device block with a device block header with a plurality of backwards references, each referencing a separate previous device block in said stream, one of said references to an immediately adjacent said previous device block, at least one of said references to a closely adjacent said previous device block, and at least one of said references to a distant said previous device block.

11. The method of claim 10, wherein said step of recording a construct additionally, in each said region having said linear sequential format data, comprises providing references to all said device blocks of said region.

12. The method of claim 10, wherein said device blocks have sequence numbers, and wherein said backwards references are in terms of said device block sequence numbers, and in terms of said sequentially numbered logical sectors.

13. The method of claim 10, wherein said step of organizing said linear sequential format data additionally comprises organizing said linear sequential format data in a stream of sequential device packets, no greater in size than, and none of which span a boundary between, said device blocks; and, for each of said device packets of a device block, placing a device packet header element in said device block header.

14. The method of claim 13, wherein said device packet header elements each comprises an indicator of said linear sequential format data of said device packet, in terms of said linear sequential format.

15. A method for providing a structure for storing data of a linear sequential format on a random access medium, said medium having a plurality of equal sized logical sectors as a smallest single writeable/readable unit, said logical sectors sequentially numbered, comprising:

organizing data of said linear sequential format in a stream of sequential device blocks of variable lengths for writing and reading;

recording a third level construct comprising at least one region for writing and reading data in said linear sequential format, each said region having an identification of said region in terms related to said device blocks and to said sequentially numbered logical sectors;

providing each said device block with a device block header with a plurality of backwards references, each referencing a separate previous device block in said stream, one of said references to an immediately adjacent said previous device block, at least one of said references to a closely adjacent said previous device block, and at least one of said references to a distant said previous device block;

recording a second level construct comprising a global device block map having at least one global device block element for each said region, each said global device block element identifying bounds of said data recorded in said region in terms of said sequentially numbered logical sectors; and recording a first level construct comprising at least one format identifier having a pointer indicating location and size of said second level construct, said location and size in terms of said sequentially numbered logical sectors.

16. A data storage file system for providing a mapping structure for storing data of any of various formats on a random access medium, said medium having a plurality of equal sized logical sectors as a smallest single writeable/readable unit, said logical sectors sequentially numbered, comprising:

a data storage recording system coupleable to said random access medium for writing and reading information on said random access medium, said data storage recording system:

recording a third level construct comprising at least one region for writing and reading data in one of said various formats, each said region having an identification of said region in terms related to said one format of said data and related to said sequentially numbered logical sectors;

recording a second level construct comprising a global device block map having at least one global device block element for each said region, each said global device block element identifying bounds of said data recorded in said region in terms of said sequentially numbered logical sectors; and recording a first level construct comprising at least one format identifier having a pointer indicating location and size of said second level construct, said location and size in terms of said sequentially numbered logical sectors.

17. The data storage file system of claim 16, wherein said data storage recording system additionally, in recording said first level construct, records two said format identifiers, located respectively at a lowest numbered of said sequentially numbered logical sectors, and at a highest numbered of said sequentially numbered logical sectors.

18. The data storage file system of claim 17, wherein said data storage recording system, in recording said first level construct, each of said format identifiers additionally comprises pointers to itself and the other said format identifier.

19. The data storage file system of claim 16, wherein said data storage recording system, in recording said second level construct, additionally comprises each said global device block element identifying said format of said data recorded in said region, and identifying said bounds of said data in terms relating to said format.

20. The data storage file system of claim 16, wherein said one of said various formats for writing and reading data for at least one of said regions of said third level construct comprises a linear sequential format, wherein said data storage recording system additionally:

organizes data of said linear sequential format in a stream of sequential device blocks of variable lengths for writing and reading, each said device block having a device block header with a plurality of backwards references, each referencing a separate previous device block in said stream, one of said references to an immediately adjacent said previous device block, at least one of said references to a closely adjacent said previous device block, and at least one of said references to a distant said previous device block.

21. The data storage file system of claim 20, wherein said data storage recording system, in recording said third level construct, additionally, in each said region having said linear sequential format data, provides references to all said device blocks of said region.

22. The data storage file system of claim 20, wherein said device blocks have sequence numbers, and wherein said backwards references are in terms of said device block sequence numbers, and in terms of said sequentially numbered logical sectors.

23. The data storage file system of claim 20, wherein said data storage recording system additionally organizes said linear sequential format data in a stream of sequential device packets, no greater in size than, and none of which span a boundary between, said device blocks; and, for each of said device packets of a device block, places a device packet header element in said device block header.

24. The data storage file system of claim 23, wherein said device packet header elements each comprises an indicator of said linear sequential format data of said device packet, in terms of said linear sequential format.

25. A data storage file system for providing a structure for storing data of a linear sequential format on a random access medium, said medium having a plurality of equal sized logical sectors as a smallest single writeable/readable unit, said logical sectors sequentially numbered, comprising:

a data storage recording system coupleable to said random access medium for writing and reading information on said random access medium, said data storage recording system:

organizing data of said linear sequential format in a stream of sequential device blocks of variable lengths for writing and reading;

recording a construct comprising at least one region for writing and reading data in said linear sequential format, each said region having an identification of said region in terms related to said device blocks and to said sequentially numbered logical sectors; and providing each said device block with a device block header with a plurality of backwards references, each referencing a separate previous device block in said stream, one of said references to an immediately adjacent said previous device-block, at least one of said references to a closely adjacent said previous device block, and at least one of said references to a distant said previous device block.

26. The data storage file system of claim 25, wherein said data storage recording system, in recording said construct, additionally, in each said region having said linear sequential format data, provides references to all said device blocks of said region.

27. The data storage file system of claim 25, wherein said device blocks have sequence numbers, and wherein said backwards references are in terms of said device block sequence numbers, and in terms of said sequentially numbered logical sectors.

28. The data storage file system of claim 25, wherein said data storage recording system additionally organizes said linear sequential format data in a stream of sequential device packets, no greater in size than, and none of which span a boundary between, said device blocks; and, for each of said device packets of a device block, places a device packet header element in said device block header.

29. The data storage file system of claim 28, wherein said device packet header elements each comprises an indicator of said linear sequential format data of said device packet, in terms of said linear sequential format.

30. A data storage file system for providing a structure for storing data of a linear sequential format on a random access medium, said medium having a plurality of equal sized logical sectors as a smallest single writeable/readable unit, said logical sectors sequentially numbered, comprising:

a data storage recording system coupleable to said random access medium for writing and reading information on said random access medium, said data storage recording system:

organizing data of said linear sequential format in a stream of sequential device blocks of variable lengths for writing and reading;

recording a third level construct comprising at least one region for writing and reading data in said linear sequential format, each said region having an identification of said region in terms related to said device blocks and to said sequentially numbered logical sectors;

providing each said device block with a device block header with a plurality of backwards references, each referencing a separate previous device block in said stream, one of said references to an immediately adjacent said previous device block, at least one of said references to a closely adjacent said previous device block, and at least one of said references to a distant said previous device block recording a second level construct comprising a global device block map having at least one global device block element for each said region, each said global device block element identifying bounds of said data recorded in said region in terms of said sequentially numbered logical sectors; and recording a first level construct comprising at least one format identifier having a pointer indicating location and size of said second level construct, said location and size in terms of said sequentially numbered logical sectors.

31. A removable random access medium for storing data of any of various formats, comprising:

a plurality of equal sized logical sectors, said logical sectors comprising a smallest single writeable/readable unit, said logical sectors sequentially numbered;

a third level construct comprising at least one region for writing and reading data in one of said various formats, each said region having an identification of said region in terms related to said one format of said data, and related to said sequentially numbered logical sectors;

a second level construct comprising a global device block map having at least one global device block element for each said region, each said global device block element identifying bounds of said data recorded in said region in terms of said sequentially numbered logical sectors; and a first level construct comprising at least one format identifier having a pointer indicating location and size of said second level construct, said location and size in terms of said sequentially numbered logical sectors.

32. The removable random access medium of claim 31, wherein said first level construct comprises two said format identifiers, located respectively at a lowest numbered of said sequentially numbered logical sectors, and at a highest numbered of said sequentially numbered logical sectors.

33. The removable random access medium of claim 32, wherein, in said first level construct, each of said format identifiers additionally comprises pointers to itself and the other said format identifier.

34. The removable random access medium of claim 31, wherein said second level construct additionally comprises each said global device block element identifying said format of said data recorded in said region, and identifying said bounds of said data in terms relating to said format.

35. The removable random access medium of claim 31, wherein said one of said various formats for writing and reading data for at least one of said regions of said third level construct comprises a linear sequential format, wherein said removable random access medium additionally comprises:

a format for said data of said linear sequential format comprising a stream of sequential device blocks of variable lengths for writing and reading, each said device block having a device block header with a plurality of backwards references, each referencing a separate previous device block in said stream, one of said references to an immediately adjacent said previous device block, at least one of said references to a closely adjacent said previous device block, and at least one of said references to a distant said previous device block.

36. The removable random access medium of claim 35, wherein said third level construct additionally comprises, in each said region having said linear sequential format data, references to all said device blocks of said region.

37. The removable random access medium of claim 35, wherein said device blocks have sequence numbers, and wherein said backwards references are in terms of said device block sequence numbers, and in terms of said sequentially numbered logical sectors.

38. The removable random access medium of claim 35, wherein said format for said linear sequential format data additionally comprises a stream of sequential device packets organizing said linear sequential format data, said device packets, no greater in size than, and none of which span a boundary between, said device blocks; and, for each of said device packets of a device block, a device packet header element placed in said device block header.

39. The removable random access medium of claim 38, wherein said device packet header elements each comprises an indicator of said linear sequential format data of said device packet, in terms of said linear sequential format.

40. A random access medium for storing data of a linear sequential format, comprising:
  a plurality of equal sized logical sectors, said logical sectors comprising a smallest single writeable/readable unit, said logical sectors sequentially numbered;
  a format for said data of said linear sequential format comprising a stream of sequential device blocks of variable lengths for writing and reading;
  a construct comprising at least one region for writing and reading data in said linear sequential format, each said region having an identification of said region in terms related to said device blocks and to said sequentially numbered logical sectors; and
  each said device block having a device block header with a plurality of backwards references, each referencing a separate previous device block in said stream, one of said references to an immediately adjacent said previous device block, at least one of said references to a closely adjacent said previous device block, and at least one of said references to a distant said previous device block.

41. The random access medium of claim 40, wherein said construct additionally comprises, in each said region having said linear sequential format data, references to all said device blocks of said region.

42. The random access medium of claim 40, wherein said device blocks have sequence numbers, and wherein said backwards references are in terms of said device block sequence numbers, and in terms of said sequentially numbered logical sectors.

43. The random access medium of claim 40, wherein said format for said linear sequential format data additionally comprises a stream of sequential device packets organizing said linear sequential format data, said device packets, no greater in size than, and none of which span a boundary between, said device blocks; and, for each of said device packets of a device block, a device packet header element placed in said device block header.

44. The random access medium of claim 43, wherein said device packet header elements each comprises an indicator of said linear sequential format data of said device packet, in terms of said linear sequential format.

45. A random access medium for storing data of a linear sequential format, comprising:
  a plurality of equal sized logical sectors, said logical sectors comprising a smallest single writeable/readable unit, said logical sectors sequentially numbered;
  a format for said data of said linear sequential format comprising a stream of sequential device blocks of variable lengths for writing and reading;
  a third level construct comprising at least one region for writing and reading data in said linear sequential format, each said region having an identification of said region in terms related to said device blocks and to said sequentially numbered logical sectors;
  each said device block having a device block header with a plurality of backwards references, each referencing a separate previous device block in said stream, one of said references to an immediately adjacent said previous device block, at least one of said references to a closely adjacent said previous device block, and at least one of said references to a distant said previous device block;
  a second level construct comprising a global device block map having at least one global device block element for each said region, each said global device block element identifying bounds of said data recorded in said region in terms of said sequentially numbered logical sectors; and
  a first level construct comprising at least one format identifier having a pointer indicating location and size of said second level construct, said location and size in terms of said sequentially numbered logical sectors.

46. A method for providing a mapping structure for storing data of any of various formats on a random access medium, said medium having a plurality of equal sized logical sectors as a smallest single writeable/readable unit, said logical sectors sequentially numbered, comprising:
  recording a third level construct comprising a plurality of regions, each said region for writing and reading data in one of said various formats, each said region having an identification of said region in terms related to said one format of said data, and related to said sequentially numbered logical sectors;
  recording a second level construct comprising a global device block map having at least one global device block element for each said region, each said global device block element identifying bounds of said data recorded in said region in terms of said sequentially numbered logical sectors, and additionally identifying at least one set of said regions by a partition identifier, and identifying each said region of said set by a region sequence number; and
  recording a first level construct comprising at least one format identifier having a pointer indicating location and size of said second level construct, said location and size in terms of said sequentially numbered logical sectors.

47. A method for providing a structure for storing data of a linear sequential format on a random access medium, said medium having a plurality of equal sized logical sectors as a smallest single writeable/readable unit, said logical sectors sequentially numbered, comprising:
  organizing data of said linear sequential format in a stream of sequential device blocks of variable lengths for writing and reading, each said device block organized in stream of device packets;
  recording a construct comprising at least one region for writing and reading data in said linear sequential format, each said region having an identification of said region in terms related to said device blocks and to said sequentially numbered logical sectors; and
  providing each said device block with a device block header with a plurality of backwards references, each referencing a separate previous device block in said stream, one of said references to an immediately adjacent said previous device block, at least one of said references to a closely adjacent said previous device block, and at least one of said references to a distant said previous device block, and, placing in each said device block header, a device packet header element for each of said device packets of said device block.

48. The method of claim 47, wherein said device block headers with said device packet header elements therof, are separate from said data.

49. A method for providing a structure for storing data of a linear sequential format on a random access medium, said medium having a plurality of equal sized logical sectors as a smallest single writeable/readable unit, said logical sectors sequentially numbered, comprising:

organizing data of said linear sequential format in a stream of sequential device blocks of variable lengths for writing and reading, each said device block organized in a stream of device packets;

recording a third level construct comprising at least one region for writing and reading data in said linear sequential format, each said region having an identification of said region in terms related to said device blocks and to said sequentially numbered logical sectors;

providing each said device block with a device block header with a plurality of backwards references, each referencing a separate previous device block in said stream, one of said references to an immediately adjacent said previous device block, at least one of said references to a closely adjacent said previous device block, and at least one of said references to a distant said previous device block, and, placing in each said device block header, a device packet header element for each of said device packets of said device block;

recording a second level construct comprising a global device block map having at least one global device block element for each said region, each said global device block element identifying bounds of said data recorded in said region in terms of said sequentially numbered logical sectors;

recording a first level construct comprising at least one format identifier having a pointer indicating location and size of said second level construct, said location and size in terms of said sequentially numbered logical sectors; and wherein said device block headers, said region identifications, said global device block maps, and said format identifiers, all are separate from said data.

50. A data storage file system for providing a mapping structure for storing data of any of various formats on a random access medium, said medium having a plurality of equal sized logical sectors as a smallest single writeable/readable unit, said logical sectors sequentially numbered, comprising:

a data storage recording system coupleable to said random access medium for writing and reading information on said random access medium, said data storage recording system:

recording a third level construct comprising a plurality of regions, each said region for writing and reading data in one of said various formats, each said region having an identification of said region in terms related to said one format of said data and related to said sequentially numbered logical sectors;

recording a second level construct comprising a global device block map having at least one global device block element for each said region, each said global device block element identifying bounds of said data recorded in said region in terms of said sequentially numbered logical sectors, and additionally identifying at least one set of said regions by a partition identifier, and identifying each said region of said set by a region sequence number; and recording a first level construct comprising at least one format identifier having a pointer indicating location and size of said second level construct, said location and size in terms of said sequentially numbered logical sectors.

51. A data storage file system for providing a structure for storing data of a linear sequential format on a random access medium, said medium having a plurality of equal sized logical sectors as a smallest single writeable/readable unit, said logical sectors sequentially numbered, comprising:

a data storage recording system coupleable to said random access medium for writing and reading information on said random access medium, said data storage recording system:

organizing data of said linear sequential format in a stream of sequential device blocks of variable lengths for writing and reading, each said device block organized in a stream of device packets;

recording a construct comprising at least one region for writing and reading data in said linear sequential format, each said region having an identification of said region in terms related to said device blocks and to said sequentially numbered logical sectors; and providing each said device block with a device block header with a plurality of backwards references, each referencing a separate previous device block in said stream, one of said references to an immediately adjacent said previous device block, at least one of said references to a closely adjacent said previous device block, and at least one of said references to a distant said previous device block, and, placing in each said device block header, a device packet header element for each of said device packets of said device block.

52. The data storage file system of claim 51, wherein said device block headers with said device packet header elements thereof, are separate from said data.

53. A data storage file system for providing a structure for storing data of a linear sequential format on a random access medium, said medium having a plurality of equal sized logical sectors as a smallest single writeable/readable unit, said logical sectors sequentially numbered, comprising:

a data storage recording system coupleable to said random access medium for writing and reading information on said random access medium, said data storage recording system:

organizing data of said linear sequential format in a stream of sequential device blocks of variable lengths for writing and reading, each said device block organized in a stream of device packets;

recording a third level construct comprising at least one region for writing and reading data in said linear sequential format, each said region having an identification of said region in terms related to said device blocks and to said sequentially numbered logical sectors;

providing each said device block with a device block header with a plurality of backwards references, each referencing a separate previous device block in said stream, one of said references to an immediately adjacent said previous device block, at least one of said references to a closely adjacent said previous device block, and at least one of said references to a distant said previous device block, and placing in each said device block header, a device packet header element for each of said device packets of said device block;

recording a second level construct comprising a global device block map having at least one global device block element for each said region, each said global device block element identifying bounds of said data recorded in said region in terms of said sequentially numbered logical sectors;

recording a first level construct comprising at least one format identifier having a pointer indicating location and size of said second level construct, said location and size in terms of said sequentially numbered logical sectors; and wherein said device block headers, said region identifications, said global device block maps, and said format identifiers, all are separate from said data.

54. A removable random access medium for storing data of any of various formats, comprising:

a plurality of equal sized logical sectors, said logical sectors comprising a smallest single writeable/readable unit, said logical sectors sequentially numbered;

a third level construct comprising a plurality of regions, each said region for writing and reading data in one of said various formats, each said region having an identification of said region in terms related to said one format of said data, and related to said sequentially numbered logical sectors;

a second level construct comprising a global device block map having at least one global device block element for each said region, each said global device block element identifying bounds of said data recorded in said region in terms of said sequentially numbered logical sectors, and additionally identifying at least one set of said regions by a partition identifier, and identifying each said region of said set by a region sequence number; and a first level construct comprising at least one format identifier having a pointer indicating location and size of said second level construct, said location and size in terms of said sequentially numbered logical sectors.

55. A random access medium for storing data of a linear sequential format, comprising:

a plurality of equal sized logical sectors, said logical sectors comprising a smallest single writeable/readable unit, said logical sectors sequentially numbered;

a format for said data of said linear sequential format comprising a stream of sequential device blocks of variable lengths for writing and reading, each said device block organized in a stream of device packets;

a construct comprising at least one region for writing and reading data in said linear sequential format, each said region having an identification of said region in terms related to said device blocks and to said sequentially numbered logical sectors; and each said device block having a device block header with a plurality of backwards references, each referencing a separate previous device block in said stream, one of said references to an immediately adjacent said previous device block, at least one of said references to a closely adjacent said previous device block, and at least one of said references to a distant said previous device block, and, each said device block having a device packet header element for each of said device packets of said device block.

56. The random access medium of claim 55, wherein said device block headers with said device packet header elements thereof, are separate from said data.

57. A random access medium for storing data of a linear sequential format, comprising:

a plurality of equal sized logical sectors, said logical sectors comprising a smallest single writeable/readable unit, said logical sectors sequentially numbered;

a format for said data of said linear sequential format comprising a stream of sequential device blocks of variable lengths for writing and reading, each said device block organized in a stream of device packets;

a third level construct comprising at least one region for writing and reading data in said linear sequential format, each said region having an identification of said region in terms related to said device blocks and to said sequentially numbered logical sectors;

each said device block having a device block header with a plurality of backwards references, each referencing a separate previous device block in said stream, one of said references to an immediately adjacent said previous device block, at least one of said references to a closely adjacent said previous device block, and at least one of said references to a distant said previous device block, and, each said device block having a device packet header element for each of said device packets of said device block;

a second level construct comprising a global device block map having at least one global device block element for each said region, each said global device block element identifying bounds of said data recorded in said region in terms of said sequentially numbered logical sectors;

a first level construct comprising at least one format identifier having a pointer indicating location and size of said second level construct, said location and size in terms of said sequentially numbered logical sectors; and wherein said device block headers, said region identifications, said global device block maps, and said format identifiers, all are separate from said data.

* * * * *